(12) United States Patent
Palmer et al.

(10) Patent No.: US 12,660,795 B2

(45) Date of Patent: Jun. 23, 2026

(54) ANIMAL DRINKING VALVE

(71) Applicant: ClearH2O, Inc., Portland, ME (US)

(72) Inventors: Jay Palmer, Brunswick, ME (US); Paul Dioli, Yarmouth, ME (US)

(73) Assignee: CLEAR H2O, INC., Portland, ME (US)

( * ) Notice: Subject to any disclaimer, the term of this patent is extended or adjusted under 35 U.S.C. 154(b) by 0 days.

(21) Appl. No.: 19/207,980

(22) Filed: May 14, 2025

(65) Prior Publication Data

US 2025/0268229 A1     Aug. 28, 2025

Related U.S. Application Data

(63) Continuation-in-part of application No. 18/800,462, filed on Aug. 12, 2024, now Pat. No. 12,402,598.

(60) Provisional application No. 63/615,846, filed on Dec. 29, 2023.

(51) Int. Cl.
  *A01K 7/06*          (2006.01)

(52) U.S. Cl.
  CPC ..................................... *A01K 7/06* (2013.01)

(58) Field of Classification Search
  CPC .... A01K 1/0356; A01K 31/005; A01K 31/22; A01K 31/17; A01K 39/0213; A01K 7/02; A01K 7/00; A01K 7/06
  See application file for complete search history.

(56) References Cited

U.S. PATENT DOCUMENTS

| | | | |
|---|---|---|---|
| 3,611,999 A | 10/1971 | Hey | |
| 3,831,558 A | 8/1974 | Forbes | |
| 3,973,698 A * | 8/1976 | Kato | B67B 7/26 |
| | | | 222/91 |
| 4,402,343 A | 9/1983 | Thompson et al. | |
| 4,790,264 A | 12/1988 | Lack et al. | |
| 5,680,970 A * | 10/1997 | Smith | B65D 47/248 |
| | | | 222/509 |

(Continued)

OTHER PUBLICATIONS

Innorack IVC Mouse 3.5, M-BTM Recyclable, Universal Innocage, 2024, website https://www.innovive.com/mouse-caging-m-btm, one page.

(Continued)

*Primary Examiner* — Monica L Perry

(74) *Attorney, Agent, or Firm* — Hayes Soloway PC

(57)          ABSTRACT

An improved animal drinking valve is disclosed. The valve may be configured to penetrate a penetrable container containing a liquid for consumption by an animal. The valve also may include an internal actuator assembly including a spring member that biases an actuator member into liquid-tight interfacing with a sealing member situated within a bore of the valve. In this arrangement, the actuator assembly may provide the valve with two-way actuation; that is, the valve may be openable to allow liquid to flow therethrough when sufficient force is applied in directions perpendicular and/or parallel to a distal end of the actuator member. Also, the valve may be of dual-material construction, having a plastic body and a metal actuator member, improving resistance to chewing by animals and other physical degradation. Furthermore, the valve optionally may include one or more exterior fin-like projections that facilitate installation of the valve in a host platform.

20 Claims, 19 Drawing Sheets

(56)  References Cited

U.S. PATENT DOCUMENTS

| | | | | |
|---|---|---|---|---|
| 5,895,383 | A * | 4/1999 | Niedospial, Jr. | B65D 51/227 |
| | | | | 604/416 |
| 6,058,881 | A | 5/2000 | Thompson | |
| 6,223,940 | B1 * | 5/2001 | Quinn | B67B 7/26 |
| | | | | 222/89 |
| 6,247,616 | B1 * | 6/2001 | Weiler | B65D 51/222 |
| | | | | 222/541.2 |
| 6,378,730 | B1 * | 4/2002 | Reddy | B67B 7/26 |
| | | | | 222/541.9 |
| 6,986,324 | B2 * | 1/2006 | Gabriel | A01K 39/0213 |
| | | | | 119/72.5 |
| 7,303,713 | B2 | 12/2007 | Gabriel et al. | |
| 7,322,492 | B2 * | 1/2008 | Kawaguchi | A61J 15/00 |
| | | | | 229/103.1 |
| 7,546,816 | B2 | 6/2009 | Gabriel et al. | |
| 7,677,531 | B1 | 3/2010 | Hollars et al. | |
| 7,937,836 | B2 * | 5/2011 | Gabriel | B29C 45/1676 |
| | | | | 222/81 |
| 9,732,882 | B2 | 8/2017 | Gabriel et al. | |
| 9,814,213 | B1 | 11/2017 | Lane et al. | |
| 10,716,293 | B1 | 7/2020 | Lane et al. | |
| 10,785,993 | B2 * | 9/2020 | Minard | A23G 9/22 |
| 11,045,389 | B2 * | 6/2021 | Brandenburger | A61J 1/1462 |
| 11,247,838 | B2 * | 2/2022 | Cedergren | B65D 25/48 |
| 2010/0122991 | A1 * | 5/2010 | Taguchi | B65D 47/061 |
| | | | | 222/83 |
| 2012/0284991 | A1 * | 11/2012 | Kusz | A61M 39/12 |
| | | | | 137/315.01 |
| 2014/0158058 | A1 * | 6/2014 | Gabriel | A01K 7/00 |
| | | | | 119/72 |

OTHER PUBLICATIONS

Innorack IVC Mouse, 3.5, MVX1 Single Filter, Recyclable, Standard IVC mouse lid with on Reemay, 2024, https://www.innovive.com/mouse-caging-mvx1, one page.

Innorack IVC Mouse 3.5, Aquavibe Mouse, Recyclable, Aquavive pre-filled 300 ml mouse water bottle options, 2024, https://www.innovive.com/aquavive-mouse-water, 2 pages.

Hydropac, Avidity Science, 2024, https://www.avidityscience.com/water-systems/animal-watering/hydropac, 16 pages.

Hydropac, A Better System, Watering for Today, Hydropac Lab Products, 2006, 16 pages.

* cited by examiner

ANIMAL DRINKING VALVE

CROSS-REFERENCE TO RELATED APPLICATIONS

This patent application is a Continuation-in-Part of U.S. patent application Ser. No. 18/800,462, titled "Animal Drinking Valve," filed on Aug. 12, 2024, which claims the benefit of U.S. Provisional Patent Application No. 63/615, 846, titled "Animal Drinking Valve," filed on Dec. 29, 2023, each of which is herein incorporated by reference in its entirety.

FIELD OF THE DISCLOSURE

The present disclosure relates to valves and, more particularly, to animal drinking valves.

BACKGROUND

Animal drinking valves are routinely used to provide a means by which an animal may hydrate itself. Dispensation of hydration through such a valve may be performed under the action of gravity or via pressurization, such as by a pump system in communication with the valve. The overall size and flowthrough capability of a given valve may be selected based on the specific animal(s) intended to use such valve. For instance, smaller valves may be employed for small animals like rodents, rabbits, and small primates, whereas larger valves may be employed for large animals like dogs, pigs, and large primates. Some animal drinking valves are constructed for use in-cage for an occupant animal, whereas others may be constructed for use in larger enclosures or in an open-air environment.

SUMMARY

The subject matter of this application may involve, in some cases, interrelated products, alternative solutions to a particular problem, and/or a plurality of different uses of a single system or article.

A first example embodiment provides an animal drinking valve configured to penetrate a penetrable container to allow a liquid to flow from the penetrable container through the valve. The valve includes a body member. The valve further includes an assembly disposed within a bore of the body member. The assembly includes a sealing member. The assembly further includes an actuator member extending through the sealing member. The assembly further includes a spring member operatively interfaced with a first portion of the actuator member so as to bias a second portion of the actuator member toward the sealing member to effectuate a liquid-tight sealing of the valve. The actuator member is movable within the bore against the bias of the spring member in at least two different directions to effectuate opening of the liquid-tight sealing of the valve.

In some cases, the actuator member includes a head portion. Also, the first portion with which the sealing member is operatively interfaced is a first side of the head portion. Furthermore, the second portion with which the spring member is operatively interfaced is a second side of the head portion situated opposite the first side of the head portion. In some such instances, the head portion has a raised feature. Also, in being operatively interfaced with the first side of the head portion, the spring member is seated on the raised feature.

In some cases, the at least two different directions are substantially perpendicular to one another. In some cases, the at least two different directions include: a first direction generally aligned with a longitudinal length of the body member; and a second direction generally aligned with a transverse width or diameter of the body member.

In some cases, in terms of flow direction in the bore of the valve, the actuator member is at least one of: downstream of the spring member; and upstream of the sealing member. In some such instances, the actuator member is both: downstream of the spring member; and upstream of the sealing member.

In some cases, the body member includes a piercing member having defined therein at least a portion of the bore of the valve. In some such instances, the spring member is at least partially disposed within the at least a portion of the bore defined in the piercing member. In some other such instances, the piercing member is of conical configuration, terminating in a sharp tip configured to facilitate penetration of the penetrable container by the valve.

In some cases, the body member has formed therein at least one opening configured to be in flow communication with the bore to allow liquid to flow from the penetrable container into the valve. In some cases, the body member includes a base member having defined therein at least a portion of the bore of the valve. In some such instances, the base member has at least one external projection extending radially outward therefrom. In some such instances, the at least one external projection is configured as a raised rib extending along at least a portion of a longitudinal length of the base member. In some instances, the at least one external projection terminates in a sharp end. In some instances, the at least one external projection has a sharp edge.

In some cases: the body member includes a polymer; and the actuator member includes a metal. In some instances, the polymer is selected from the group consisting of: polypropylene or a polypropylene-based material; polyethylene or a polyethylene-based material; and polyoxymethylene or a polyoxymethylene-based material. In some instances, the metal is selected from the group consisting of: stainless steel or a stainless-steel based material; and copper or a copper-based material.

A second example embodiment provides a system including the valve of the first example embodiment and a cage or enclosure configured to have the valve installed thereat.

A third example embodiment provides an animal drinking valve configured to penetrate a penetrable container to allow a liquid to flow from the penetrable container through the valve. The valve includes a piercing member configured to facilitate penetration of the penetrable container by the valve. The valve further includes a base member operatively coupled with the piercing member, the base member including: a body portion including at least one exterior channel feature; and at least one sealing member at least partially disposed within the at least one exterior channel feature. In operative interfacing of the valve with an installation site through which the liquid is to flow, the at least one sealing member provides a liquid-tight seal at the installation site such that the liquid does not otherwise flow through the installation site in bypass of the valve.

In some cases, the base member has defined therein: a first portion of a bore of the valve; and at least one opening configured to be in flow communication with the bore of the valve to allow liquid to flow out from the bore of the valve. In some such instances, the piercing member has defined therein: a second portion of the bore of the valve; and at least one opening configured to be in flow communication with the bore of the valve to allow liquid to flow into the bore of the valve from the penetrable container.

In some cases, the base member further includes a flange portion which, in operative interfacing of the valve with the installation site, abuts an opening formed in the installation site. In some such instances, in operative interfacing of the valve with the installation site, the at least one sealing member at least partially resides within the opening.

In some cases: the base member further includes a flange portion; and in operative interfacing of the valve with the installation site: the penetrable container resides proximate a first side of the flange; and an opening formed in the installation site resides proximate a second side of the flange, said second side opposing said first side.

In some cases, in operative interfacing of the valve with the installation site, the at least one sealing member at least partially resides within an opening of the installation site and physically contacts at least one sidewall within said opening, providing the liquid-tight seal thereat.

In some cases, the at least one sealing member includes an O-ring.

In some cases: the at least one exterior channel feature includes a plurality of exterior channel features disposed along a longitudinal length of the body portion of the base member; and the at least one sealing member includes a corresponding plurality of sealing members, each such sealing member at least partially disposed within an associated exterior channel feature. In some instances, at least one of the plurality of exterior channel features and the plurality of sealing members is a homogeneous plurality. In some instances, at least one of the plurality of exterior channel features and the plurality of sealing members is a heterogeneous plurality.

In some cases, the body portion of the base member includes a polymer. In some instances, the polymer is selected from a group consisting of: polypropylene or a polypropylene-based material; polyethylene or a polyethylene-based material; and polyoxymethylene or a polyoxymethylene-based material.

In some cases, the base member further includes at least one external projection extending radially outward from the body portion. In some instances, the at least one external projection is configured as a raised rib extending along at least a portion of a longitudinal length of the body portion of the base member. In some instances, the at least one external projection terminates in a sharp end. In some instances, the at least one external projection has a sharp edge.

In some cases, the piercing member has defined therein: a portion of a bore of the valve; and at least one opening configured to be in flow communication with the bore of the valve to allow liquid to flow from the penetrable container into the bore of the valve.

In some cases, the piercing member is of conical configuration, terminating in a sharp tip.

A fourth example embodiment provides a system including the valve of the third example embodiment and a cage or enclosure including the installation site.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

5

Figure 31:
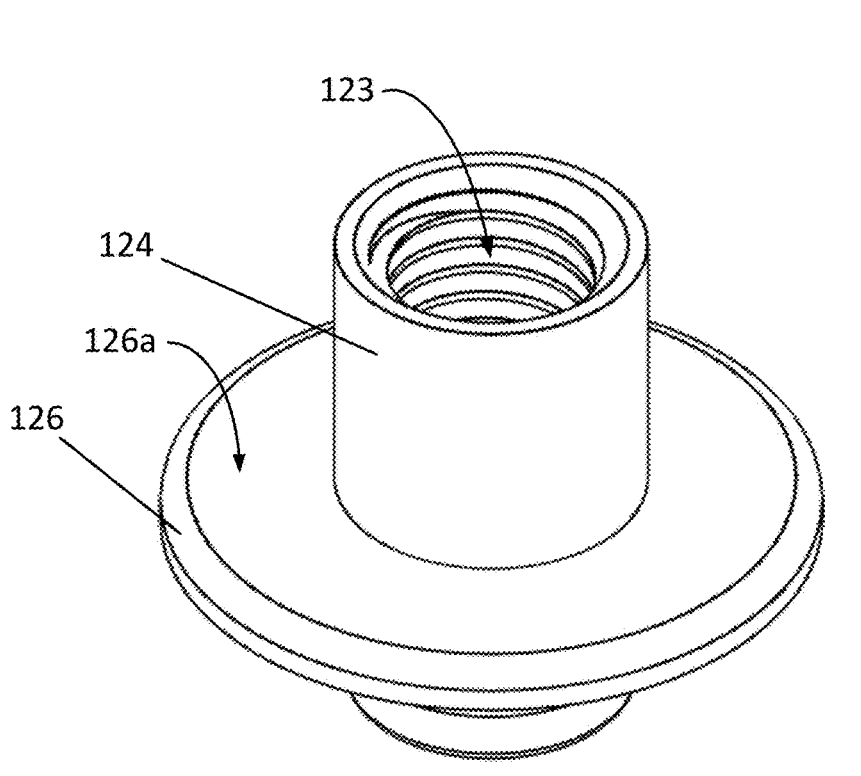
FIG. 31 is an isometric view of a base member configured in accordance with another embodiment of the present disclosure.
Figure 32:
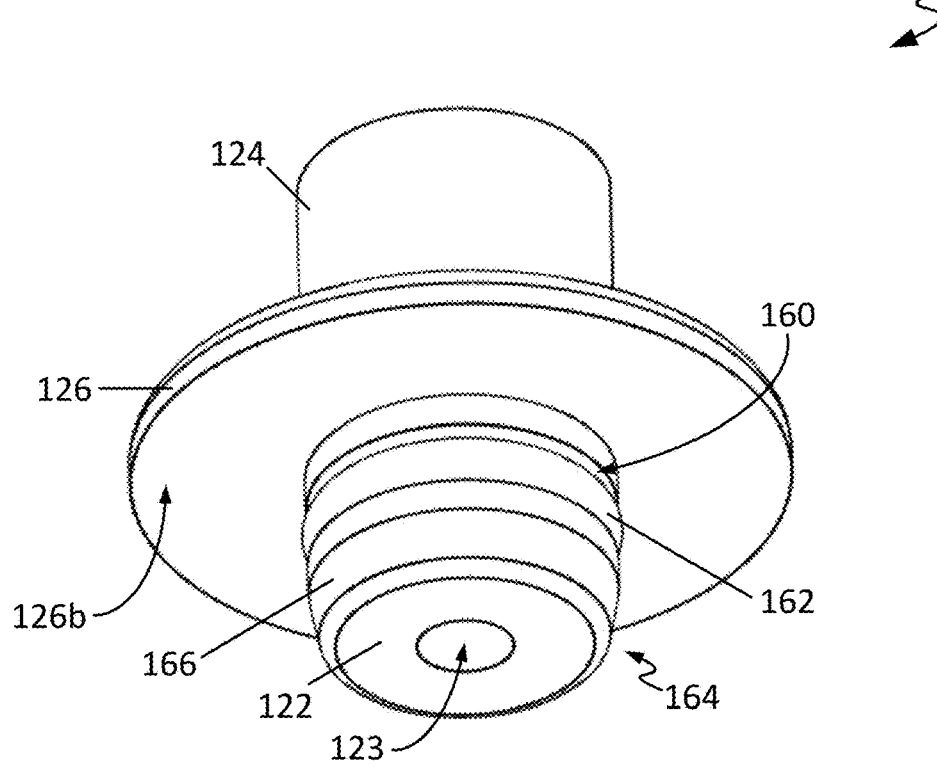

FIG. 32 is another isometric view of the base member of FIG. 31.

Figure 33:
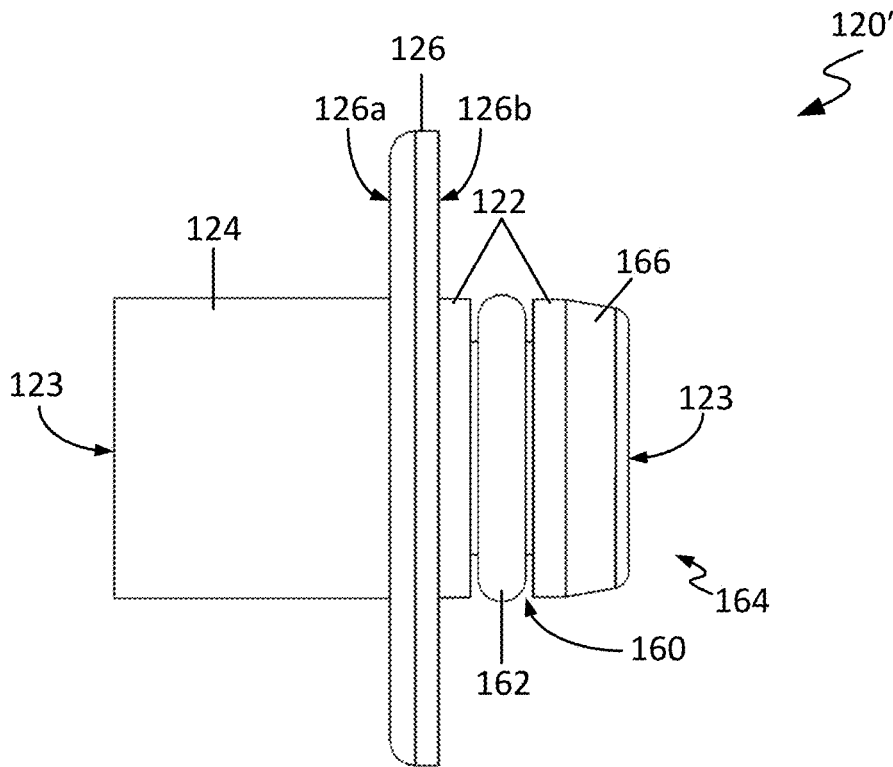

FIG. 33 is a side elevation view of the base member of FIG. 31.

Figure 34:
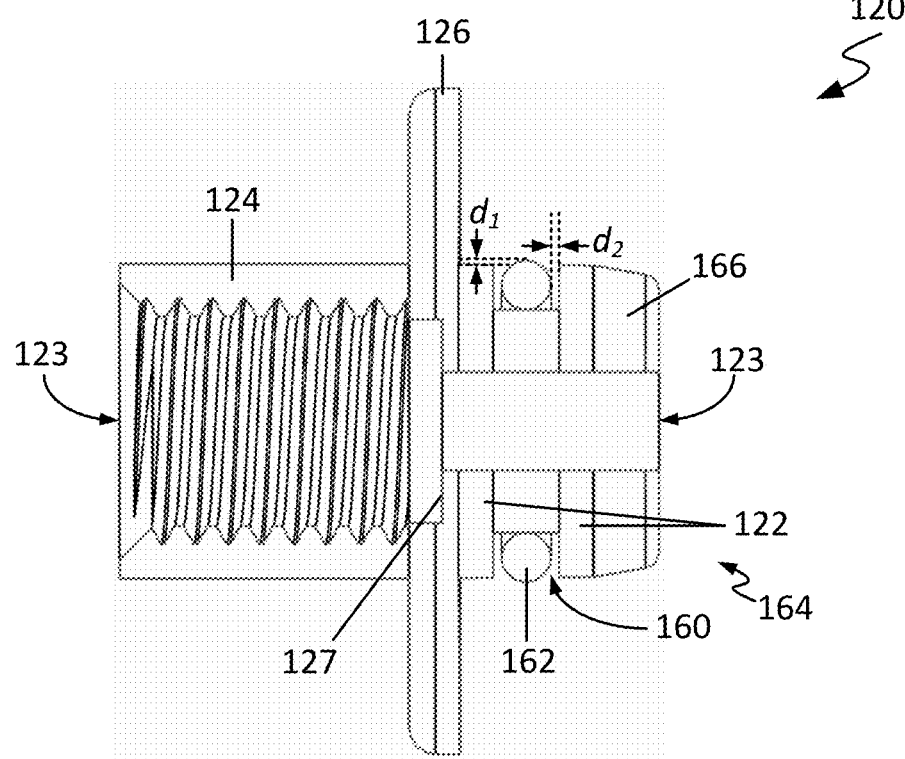

FIG. 34 is a cross-sectional view of the base member of FIG. 31.

Figure 35:
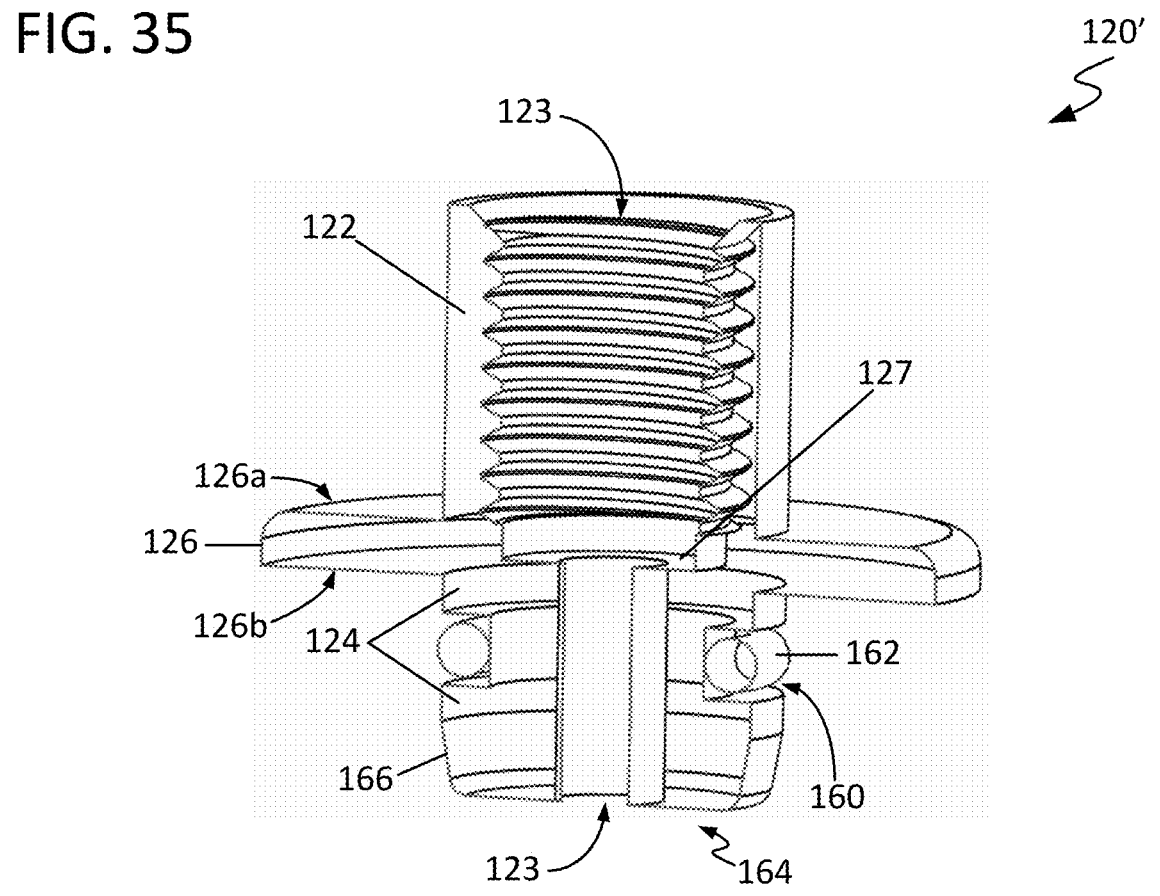

FIG. 35 is an isometric cross-sectional view of the base member of FIG. 31.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

An improved animal drinking valve is disclosed. The disclosed valve may be configured to penetrate a penetrable container containing a liquid for consumption by an animal. The disclosed valve also may include an internal actuator assembly including a spring member that biases an actuator member into liquid-tight interfacing with a sealing member situated within a bore of the valve. In this arrangement, the actuator assembly may provide the valve with two-way actuation; that is, the valve may be openable to allow liquid to flow therethrough when sufficient force is applied in directions perpendicular and/or parallel to a distal end of the actuator member. Also, in accordance with some embodiments, the disclosed valve may be of dual-material construction, having a plastic body and a metal actuator member, improving resistance to chewing by animals and other physical degradation. Furthermore, in accordance with some embodiments, the disclosed valve optionally may include one or more exterior fin-like projections that facilitate installation of the valve in a host platform. In accordance with some embodiments, the disclosed valve may be configured for use, for example, with reusable/disposable cages or other enclosures typically used for small animals, such as rodents (e.g., mice, rats, hamsters, guinea pigs, etc.). Numerous configurations and variations will be apparent in light of this disclosure.

General Overview

Existing small animal drinking valves normally are constructed from only a single material, either entirely plastic or entirely metal, with the material selection typically being dictated by a balance between animal safety and valve replacement costs. At least one existing small animal drinking valve includes a plastic internal activator rod that is susceptible to chewing (or other deforming) by animal(s), which can render the valve functionless. In such cases, if the damaged valve is not replaced in a timely manner, the animal(s) may risk dehydration and death.

Thus, and in accordance with some embodiments of the present disclosure, an improved animal drinking valve is disclosed. The disclosed valve may be configured to penetrate a penetrable container containing a liquid for consumption by an animal. The disclosed valve also may include an internal actuator assembly including a spring member that biases an actuator member into liquid-tight interfacing with a sealing member situated within a bore of the valve. In this arrangement, the actuator assembly may provide the valve with two-way actuation; that is, the valve may be openable to allow liquid to flow therethrough when sufficient force is applied in directions perpendicular and/or parallel to a distal end of the actuator member. Also, in accordance with some embodiments, the disclosed valve may be of dual-material construction, having a plastic body and a metal actuator member, improving resistance to chewing by animals and other physical degradation. Furthermore, in accordance with some embodiments, the disclosed valve optionally may include one or more exterior fin-like projections that facilitate installation of the valve in a host platform. In accordance with some embodiments, the disclosed valve may be configured for use, for example, with reusable/disposable cages or other enclosures typically used for small animals, such as rodents (e.g., mice, rats, hamsters, guinea pigs, etc.).

Some embodiments of the disclosed valve may realize advantages and benefits as compared to existing devices and approaches. For example, some embodiments disclosed herein may have improved durability and resistance to chewing by animals as compared to existing approaches. Some embodiments disclosed herein may be constructed solely from materials which are food-grade and safe for animals. Some embodiments disclosed herein may be substantially drip-free, thus conserving water (or other liquid) and keeping the host platform drier. Some embodiments disclosed herein may function without first requiring priming. Some embodiments disclosed herein may be single-use and disposable. Some embodiments disclosed herein may help to minimize (or otherwise reduce) cross-contamination.

Structure and Operation

FIGS. 1-10 illustrate several views of an animal drinking valve 100 configured in accordance with an embodiment of the present disclosure. As can be seen, valve 100 may include a piercing member 110 and a base member 120 configured to be assembled with one another in temporary or permanent manner, generally defining a body member of valve 100. Also, as can be seen, valve 100 may include an actuator member 130, a spring member 140, and a sealing member 150, generally defining an internal assembly of valve 100. As described herein, members 130, 140, and 150 may be configured to be operatively interfaced with one another to effectuate repeatable opening and closing (e.g., unsealing and sealing, respectively) of valve 100, thus controlling the ability of a liquid to flow through valve 100 in operation thereof. Each of these elements is discussed in turn below.

FIGS. 11-18 illustrate several views of a piercing member 110 configured in accordance with an embodiment of the present disclosure. As can be seen, piercing member 110, sometimes alternatively referred to as a barb or barbed tip, may include an upper body portion 112 and a lower body portion 114. Also, as can be seen, piercing member 110 may have formed therein one or more openings 115 extending into an interior of piercing member 110 and a bore 113 extending along at least a portion of the longitudinal extent (e.g., length) of piercing member 110 from upper body portion 112 to lower body portion 114. In some cases, upper body portion 112 optionally may include one or more concave contours or channels (e.g., which may be U-shaped, V-shaped, or C-shaped in cross-section) extending along all or some portion of the longitudinal extent (e.g., length) of its exterior surface and substantially aligning with one or more of openings 115.

In general, piercing member 110 may be configured to penetrate (e.g., pierce or puncture) a penetrable container 10 (e.g., pouch, sack, bladder, bag, etc.) containing water or other liquid(s) for consumption by an animal. Opening(s) 115 and bore 113 together may define, at least in part, an internal fluid channel or passageway of valve 100 through which liquid may flow (e.g., from upstream penetrable container 10) when being dispensed by valve 100.

As can be seen from FIGS. 11-18, in some embodiments, upper body portion 112 may be of generally conical shape, including (e.g., terminating in) a sharp tip 116 configured to penetrate a penetrable container 10. In some other embodiments, however, upper body portion 112 may be of generally pyramidal shape (e.g., having three, four, or more lateral faces), again including (e.g., terminating in) a sharp tip 116.

Also, the longitudinal extent (e.g., length) and transverse extent (e.g., width or diameter) of upper body portion 112 may be customized, as desired. In some embodiments, upper body portion 112 may have a length in the range of about 0.5-2.0 in (e.g., about 0.5-1.0 in, about 1.0-1.5 in, about 1.5-2.0 in, or any other sub-range in the range of about 0.5-2.0 in). In some embodiments, upper body portion 112 may have a maximum width or diameter in the range of about 0.25-0.5 in (e.g., about 0.25-0.3 in, about 0.3-0.35 in, about 0.35-0.4 in, about 0.4-0.45 in, about 0.45-0.5 in, or any other sub-range in the range of about 0.25-0.5 in).

Also, as can be seen from FIGS. 11-18, in some embodiments, lower body portion 114 may be of generally tubular shape, at least partially defining a bore 113 of piercing member 110. In some embodiments, lower body portion 114 may be generally annular in cross-sectional shape, having a circular, elliptical, semi-circular, or semi-elliptical geometry. In some other embodiments, lower body portion 114 may be generally annular in cross-sectional shape, having a polygonal (e.g., triangular, rectangular, square, etc.) geometry.

Also, the longitudinal extent (e.g., length) and transverse extent (e.g., width or diameter) of lower body portion 114 may be customized, as desired. In some embodiments, lower body portion 114 may have a length in the range of about 0.125-1.0 in (e.g., about 0.125-0.25 in, about 0.25-1.0 in, about 0.5-0.75 in, about 0.75-1.0 in, or any other sub-range in the range of about 0.125-1.0 in). In some embodiments, lower body portion 114 may have a width or diameter in the range of about 0.125-0.5 in (e.g., about 0.125-0.25 in, about 0.25-0.5 in, or any other sub-range in the range of about 0.125-0.5 in). In some embodiments, lower body portion 114 may have a substantially uniform width or diameter along its entire length. In some other embodiments, lower body portion 114 may have a non-uniform (e.g., tapered, flared, ribbed, notched, constricted, bulged, or otherwise varying) width or diameter along all or a portion of its entire length.

Regarding bore 113 of piercing member 110, the general shape thereof may be customized, as desired. In some embodiments, bore 113 may be generally circular, elliptical, semi-circular, or semi-elliptical in cross-sectional shape. In some other embodiments, bore 113 may be generally polygonal (e.g., triangular, rectangular, square, etc.) in cross-sectional shape.

Also, the longitudinal extent (e.g., length) and transverse extent (e.g., width or diameter) of bore 113 may be customized, as desired. In some embodiments, bore 113 may have a length in the range of about 0.0625-0.5 in (e.g., about 0.0625-0.1 in, about 0.1-0.25 in, about 0.25-0.5 in, or any other sub-range in the range of about 0.0625-0.5 in). In some embodiments, bore 113 may have a width or diameter in the range of about 0.125-0.5 in (e.g., about 0.125-0.25 in, about 0.25-0.5 in, or any other sub-range in the range of about 0.125-0.5 in). In some embodiments, bore 113 may have a substantially uniform width or diameter along its entire length. In some other embodiments, bore 113 may have a non-uniform (e.g., tapered, flared, ribbed, notched, constricted, bulged, or otherwise varying) width or diameter along all or a portion of its entire length. As will be appreciated in light of this disclosure, it generally may be desirable to ensure that bore 113 is sufficiently sized and of appropriate geometry to permit spring member 140 to compress and decompress therein to a degree sufficient to permit fluid flow in operation of valve 100.

Figure 1:
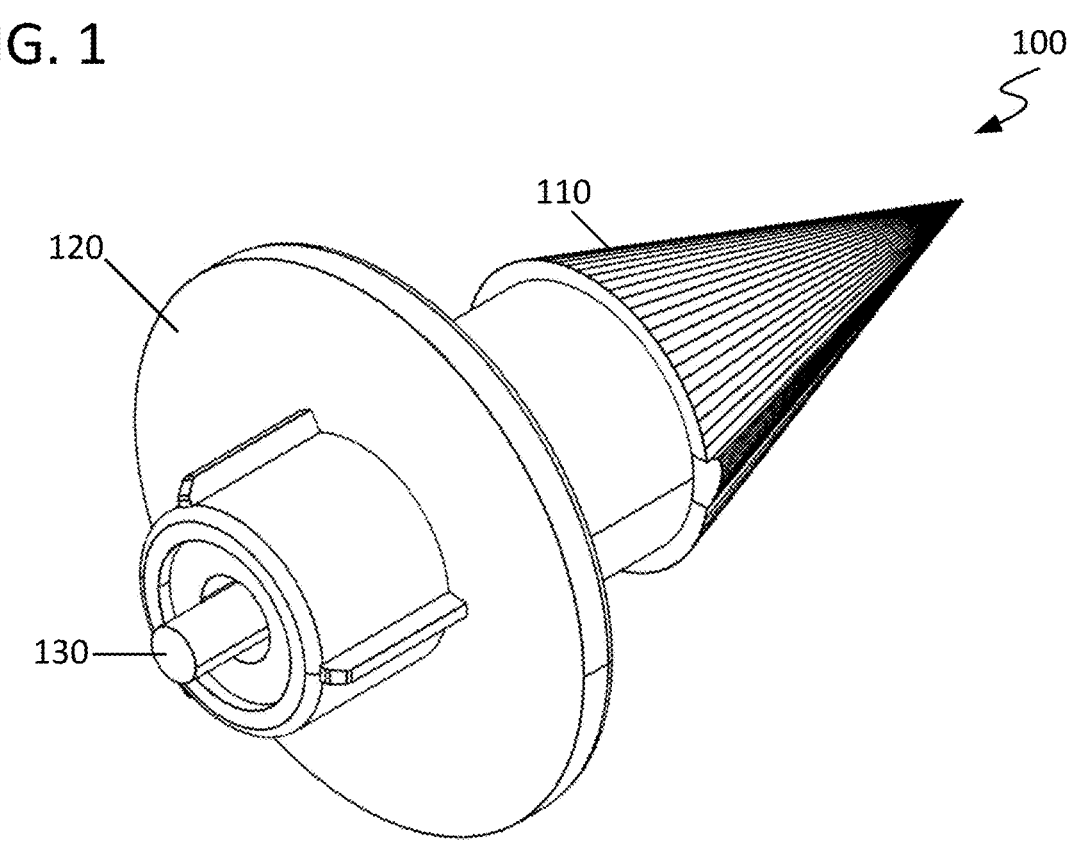
FIG. 1 is an isometric view of a valve configured in accordance with an embodiment of the present disclosure.
Figure 2:
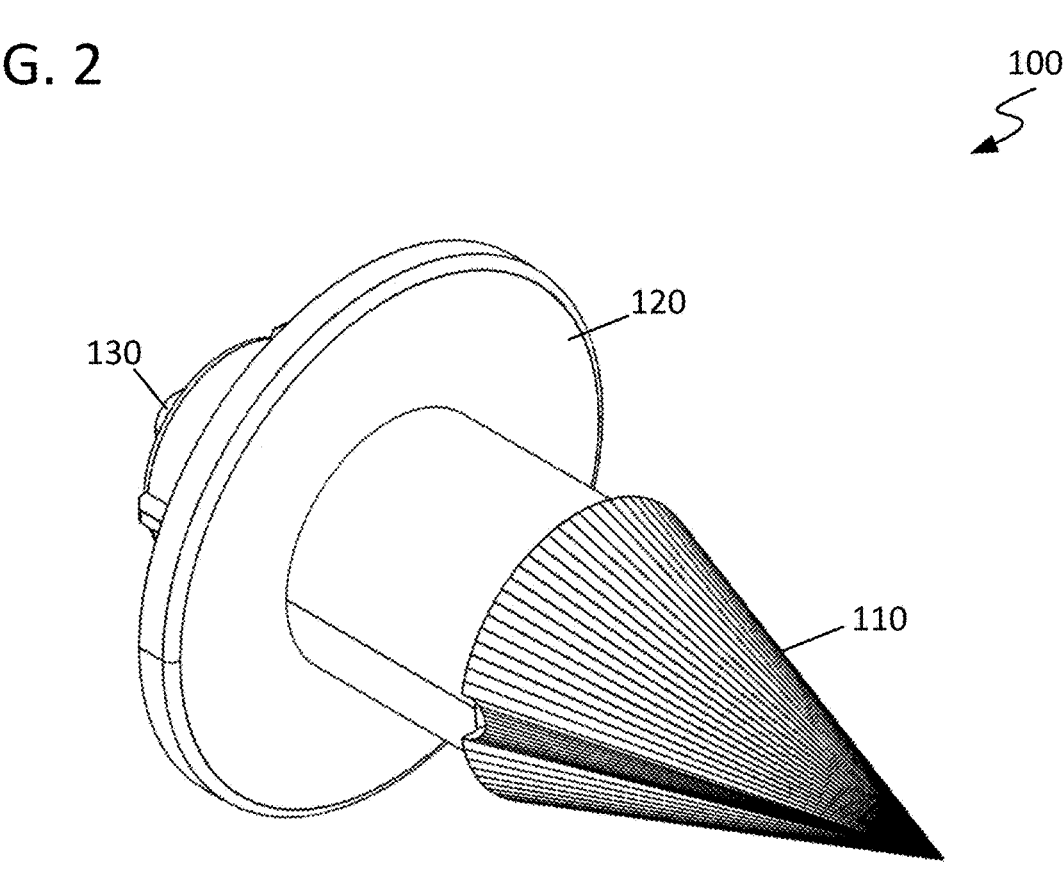
FIG. 2 is another isometric view of the valve of FIG. 1.
Figure 3:
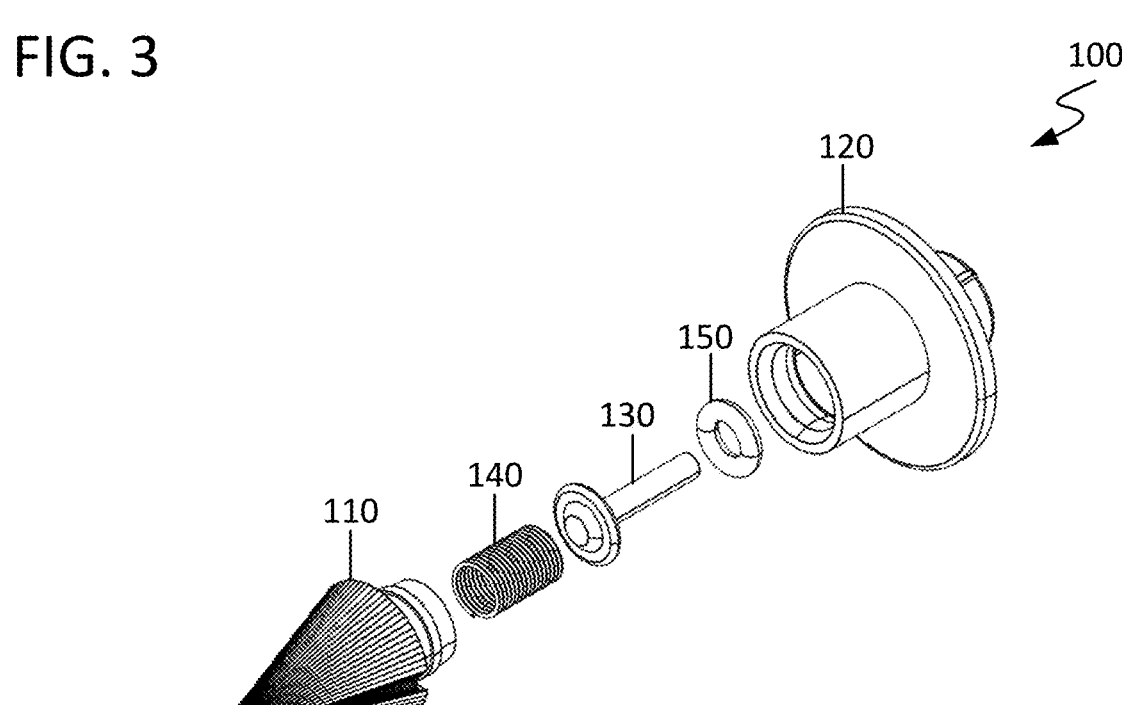
FIG. 3 is an exploded isometric view of the valve of FIG. 1.
Figure 4:
FIG. 4 is an exploded side elevation view of the valve of FIG. 1.
Figure 4:
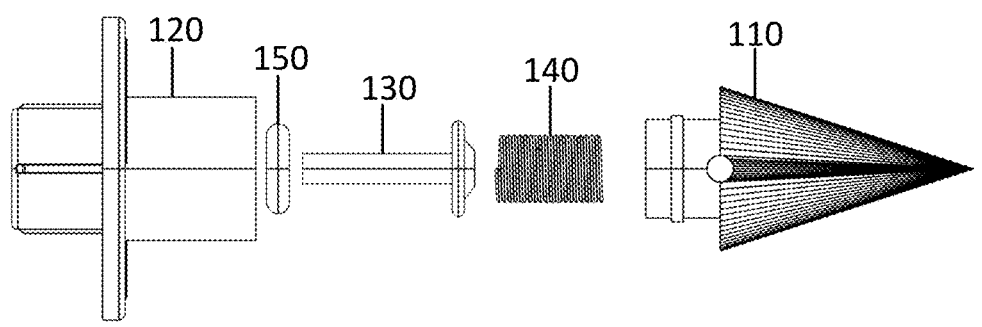
Figure 5:
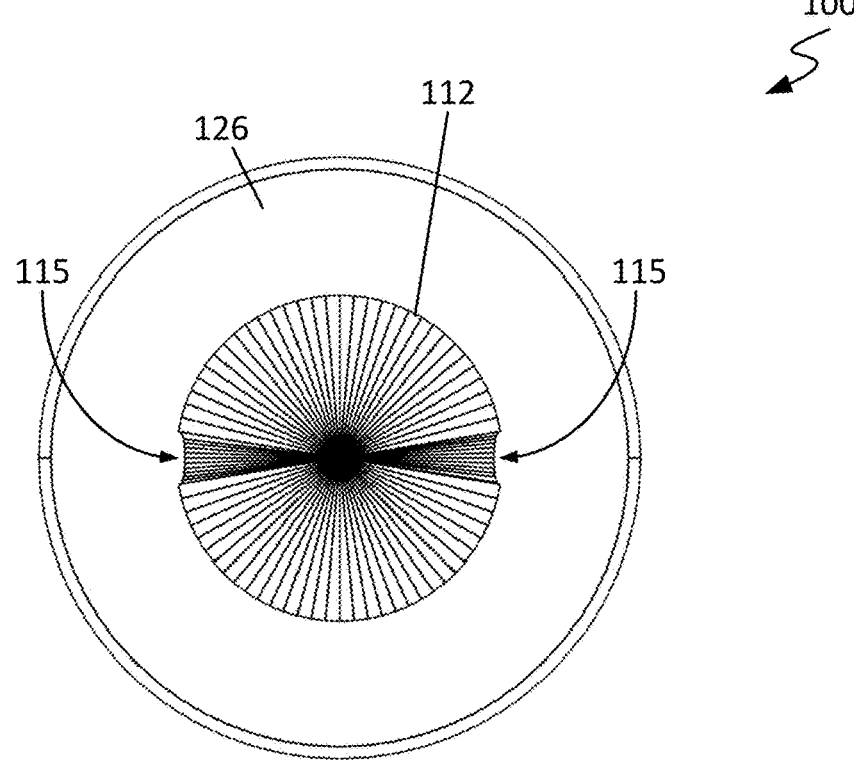
FIG. 5 is a side elevation view from a first end of the valve of FIG. 1.
Figure 6:
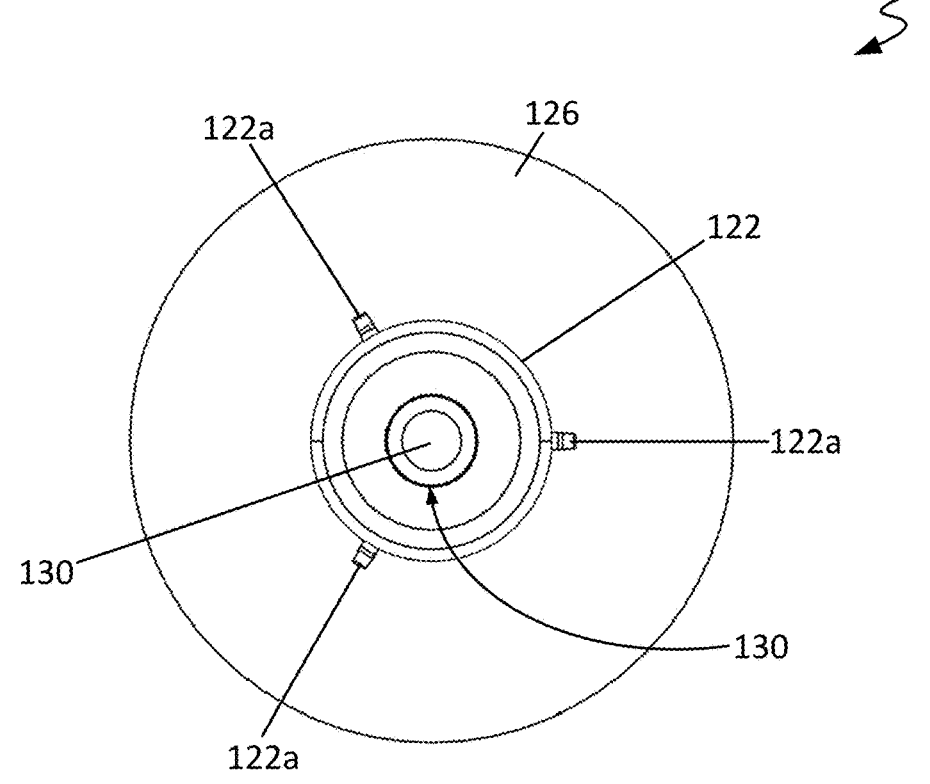
FIG. 6 is a side elevation view from a second end of the valve of FIG. 1.
Figure 7:
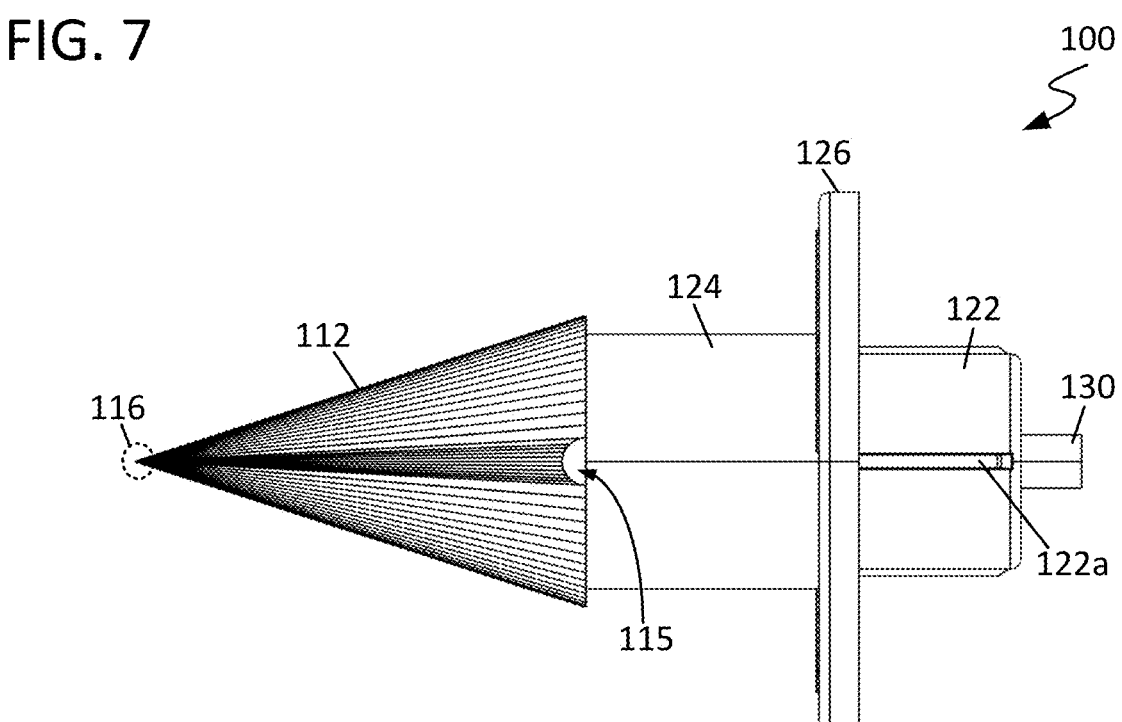
FIG. 7 is a side elevation view of the valve of FIG. 1.
Figure 8:
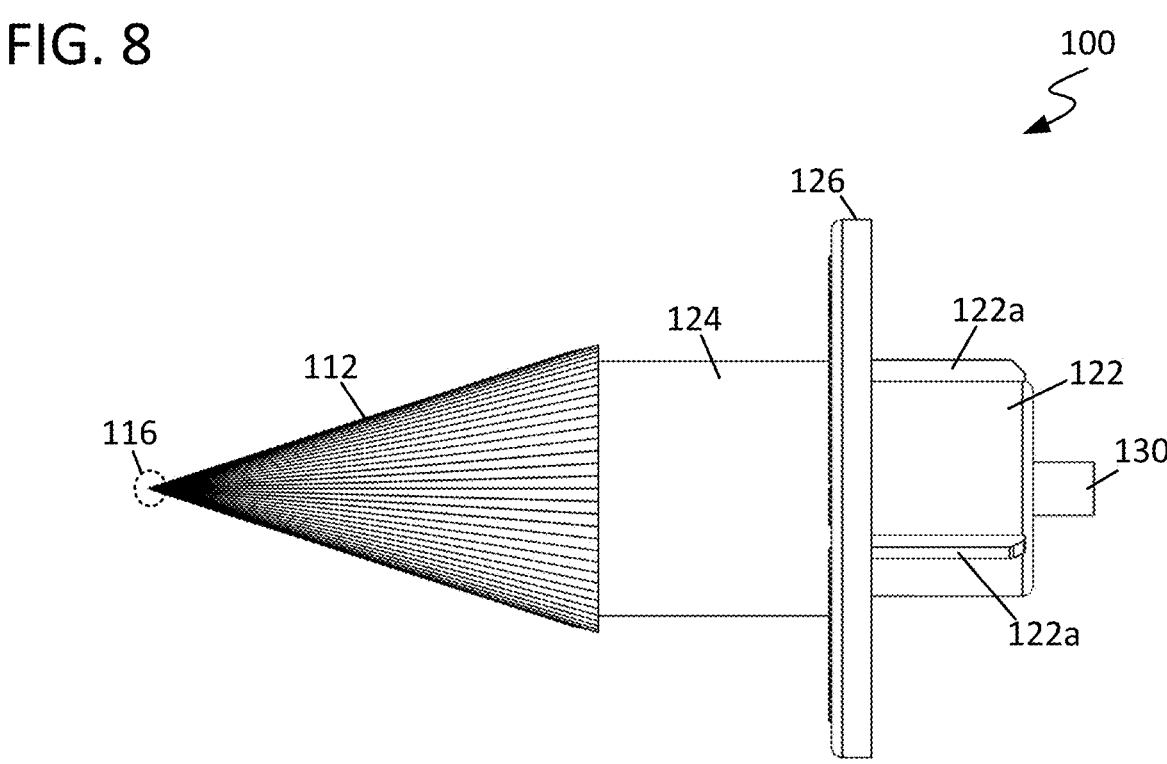
FIG. 8 is a side elevation view of the valve of FIG. 7 after rotation through 90°.
Figure 9:
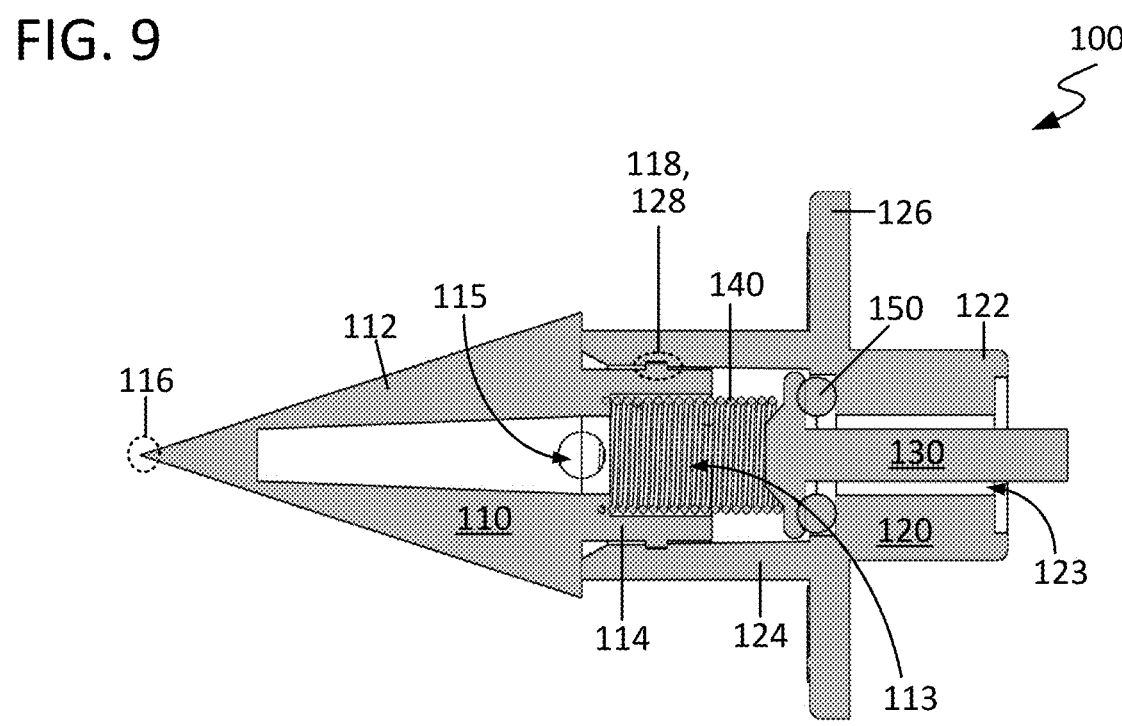
FIG. 9 is a cross-sectional view of the valve of FIG. 1.
Figure 10:
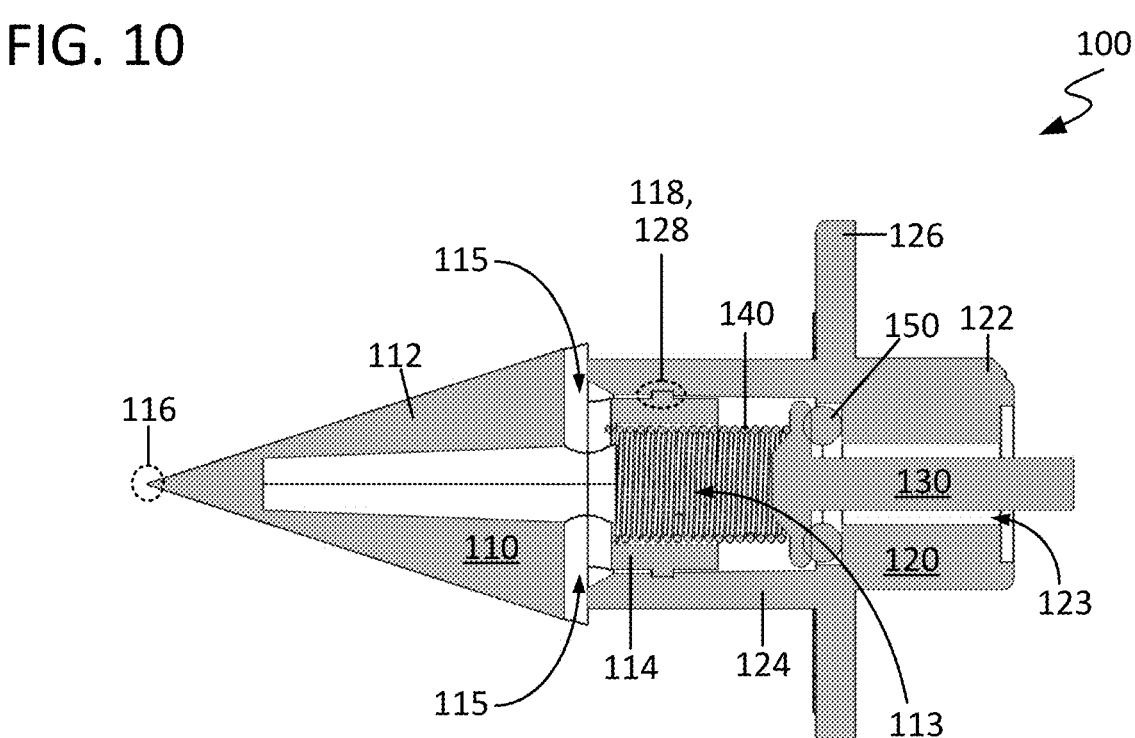
FIG. 10 is a cross-sectional view of the valve of FIG. 9 after rotation through 90°.
Figure 11:
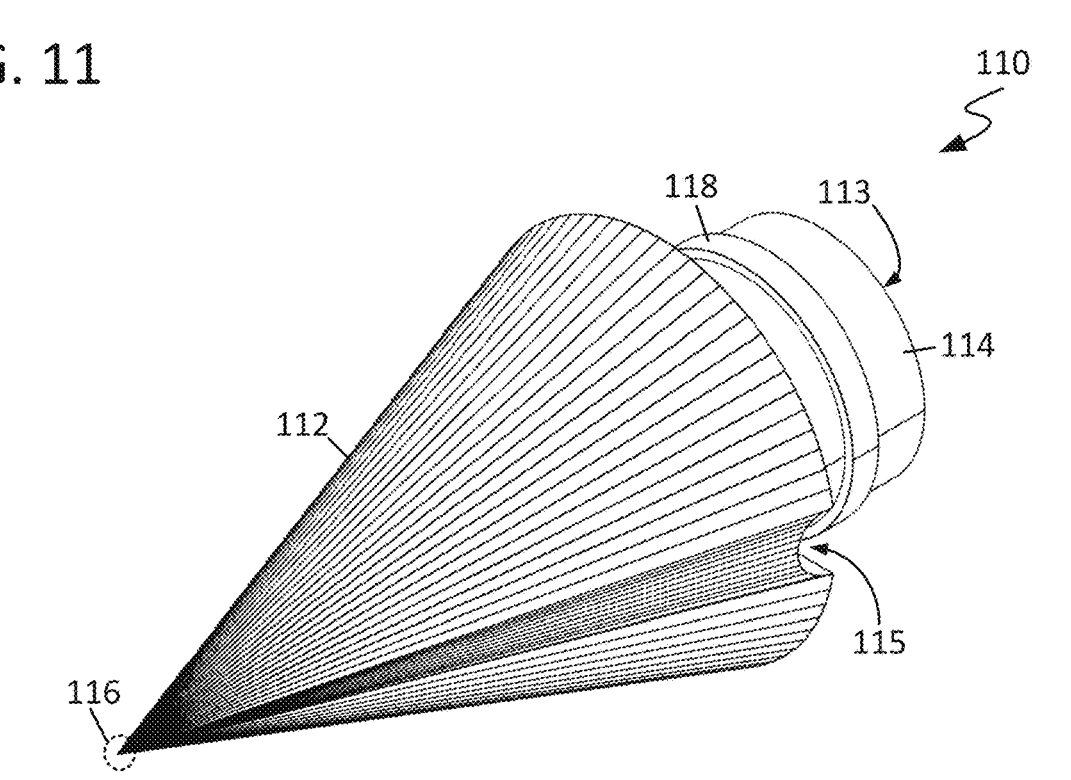
FIG. 11 is an isometric view of a piercing member configured in accordance with an embodiment of the present disclosure.
Figure 12:
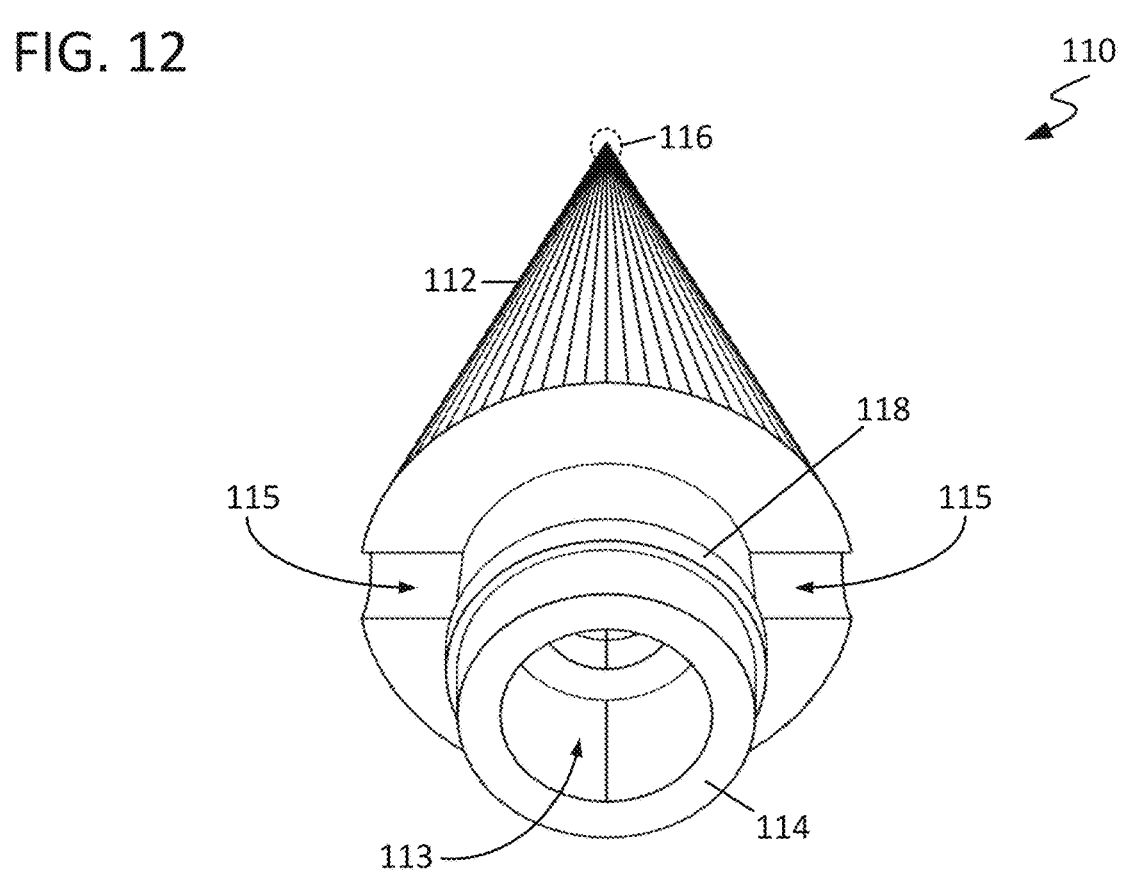
FIG. 12 is another isometric view of the piercing member of FIG. 11.
Figure 13:
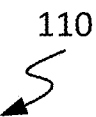
FIG. 13 is a side elevation view from a first end of the piercing member of FIG. 12.
Figure 13:
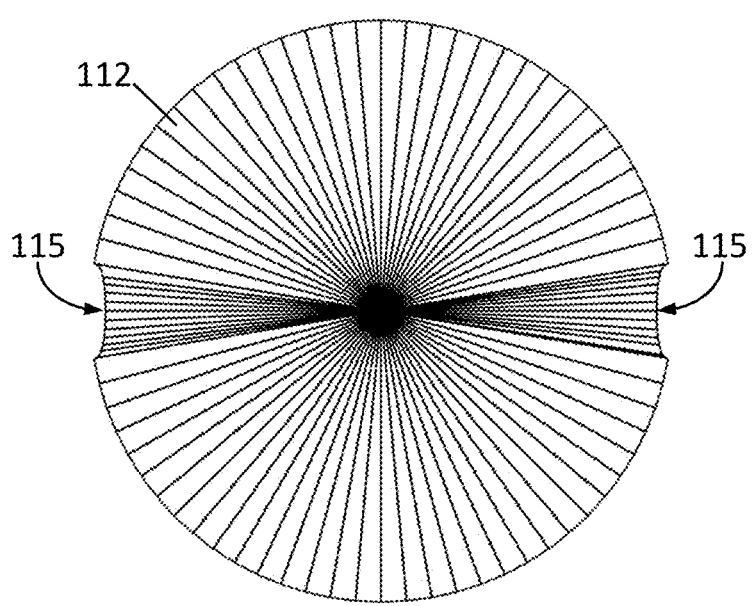
Figure 14:
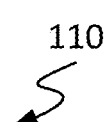
FIG. 14 is a side elevation view from a second end of the piercing member of FIG. 12.
Figure 14:
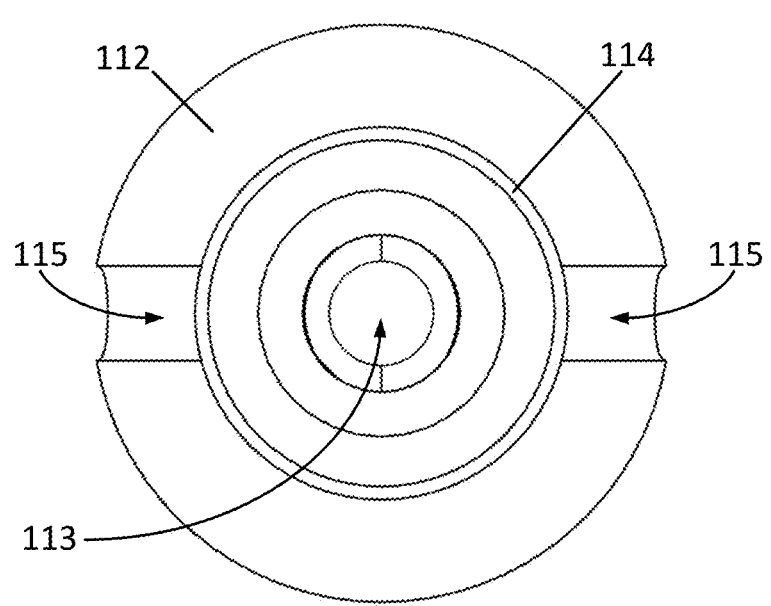
Figure 15:
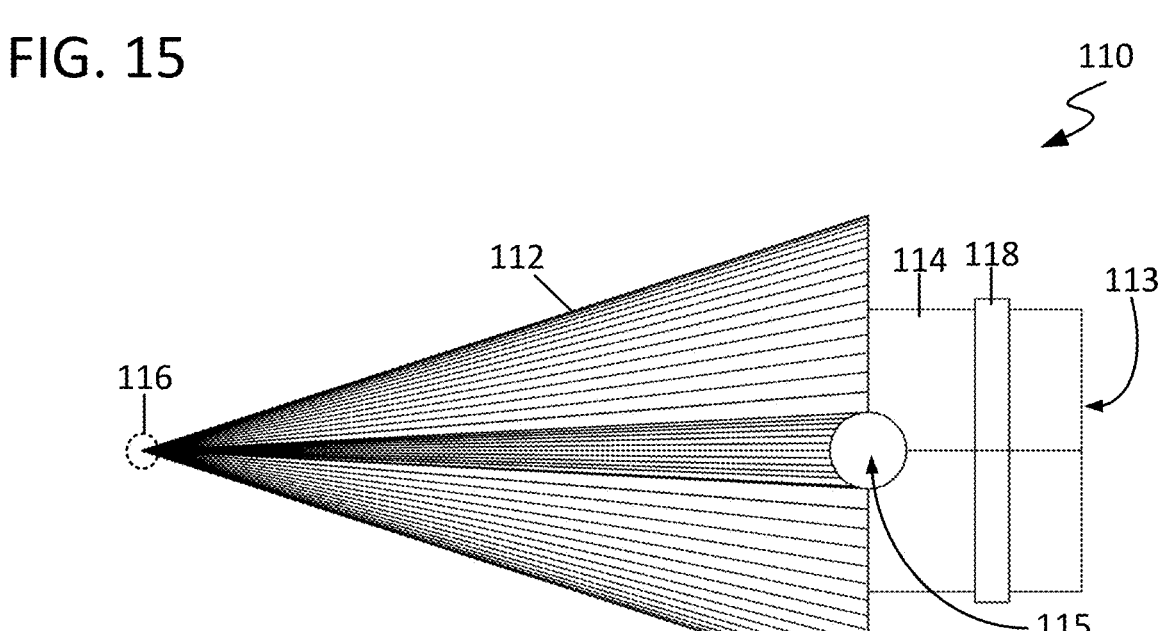
FIG. 15 is a side elevation view of the piercing member of FIG. 11.
Figure 16:
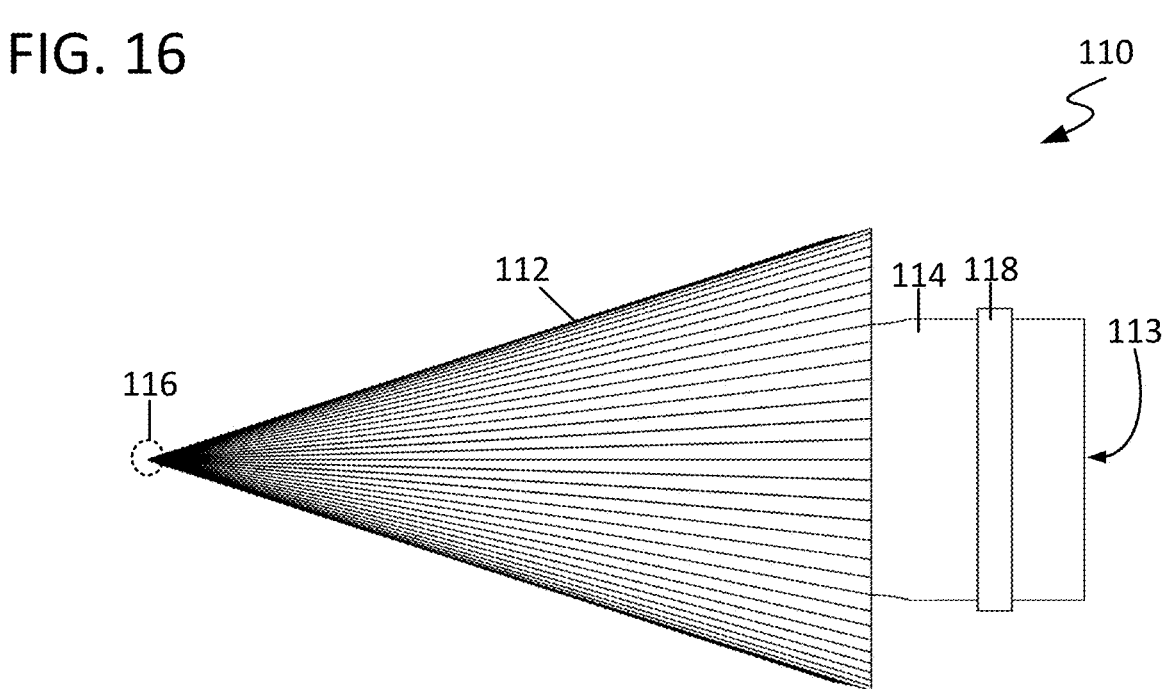
FIG. 16 is a side elevation view of the piercing member of FIG. 15 after rotation through 90°.
Figure 17:
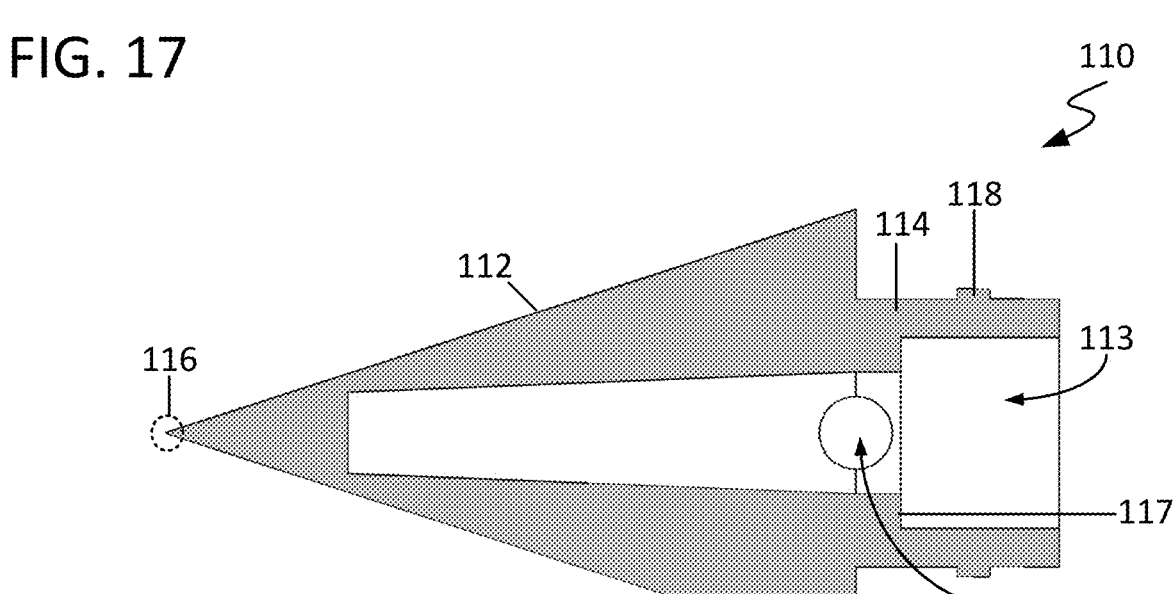
FIG. 17 is a cross-sectional view of the piercing member of FIG. 11.
Figure 18:
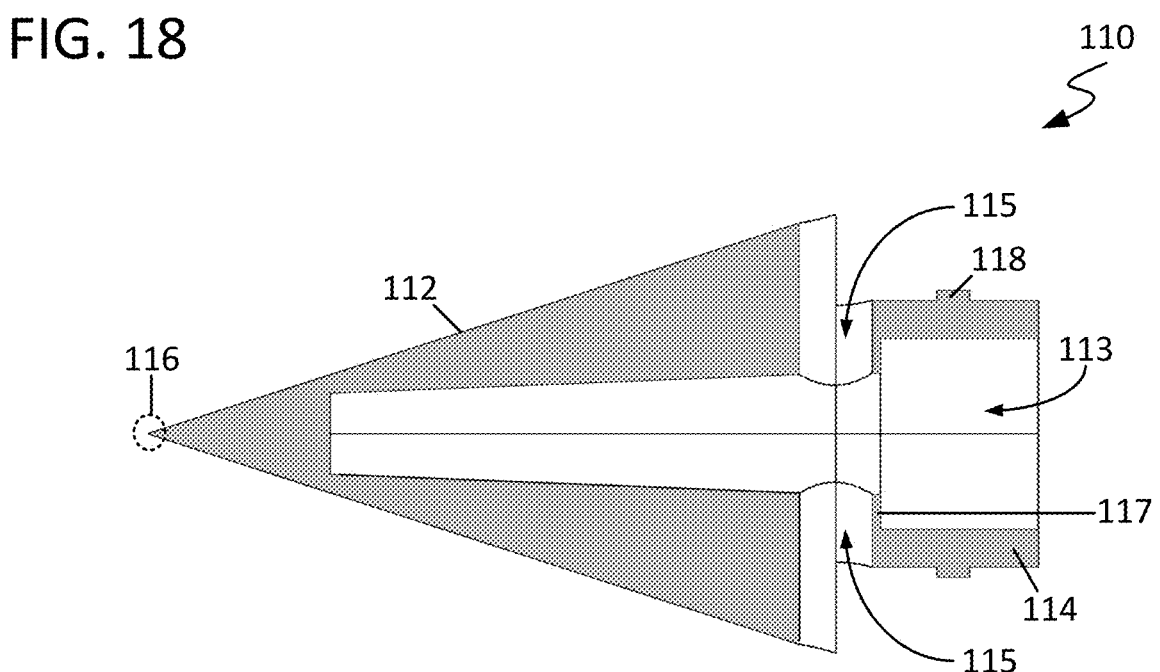
FIG. 18 is a cross-sectional view of the piercing member of FIG. 17 after rotation through 90°.
Figure 19:
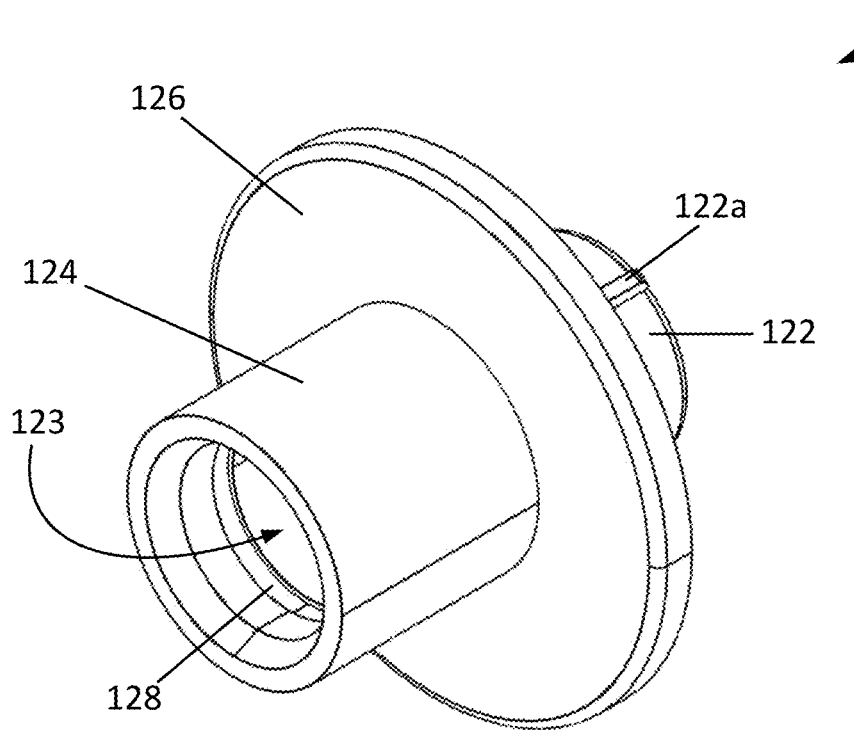
FIG. 19 is an isometric view of a base member configured in accordance with an embodiment of the present disclosure.
Figure 20:
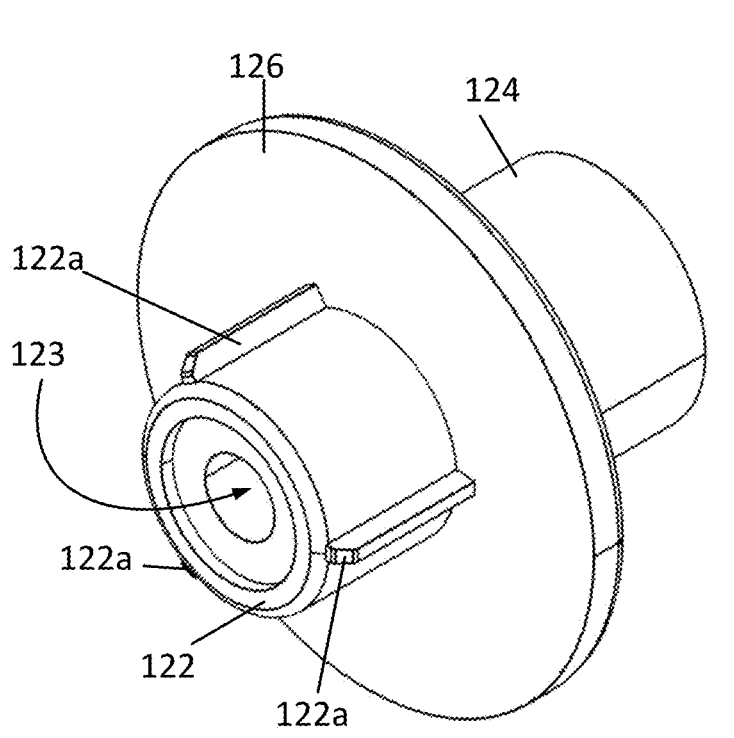
FIG. 20 is another isometric view of the base member of FIG. 19.
Figure 21:
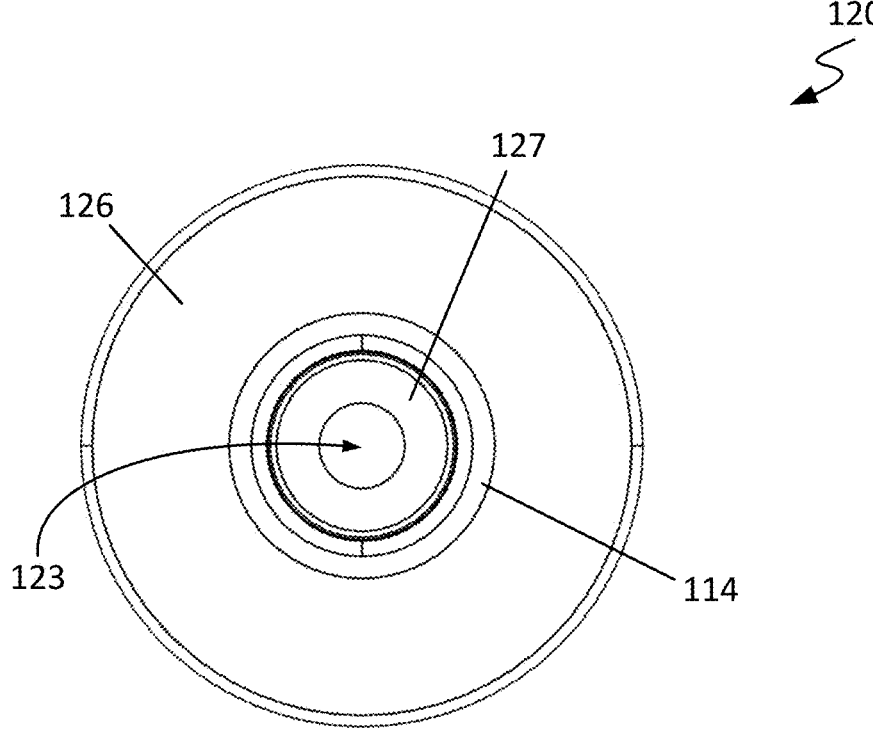
FIG. 21 is a side elevation view from a first end of the base member of FIG. 19.
Figure 22:
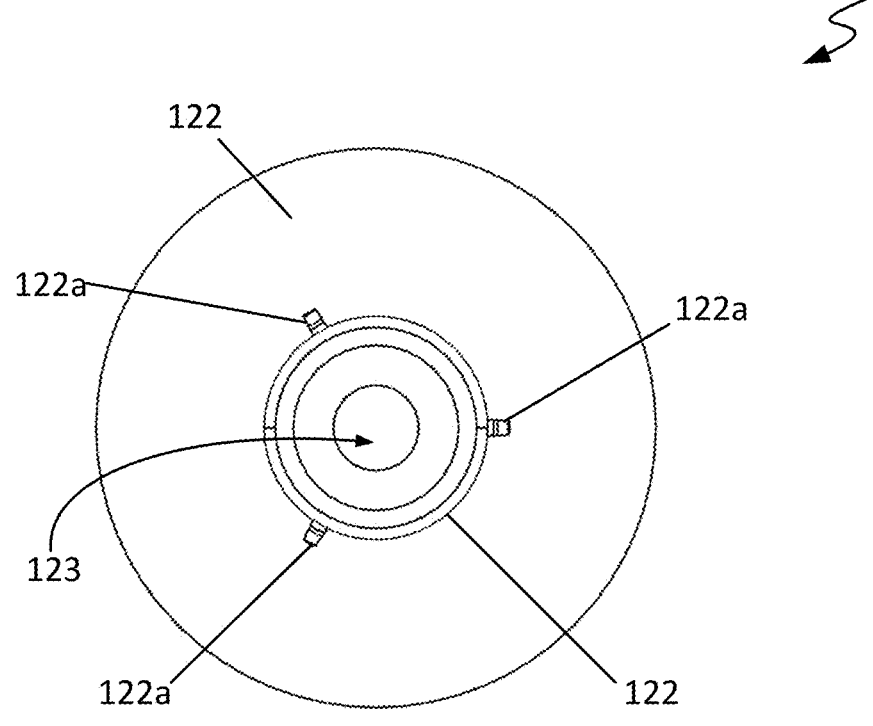
FIG. 22 is a side elevation view from a second end of the base member of FIG. 19.
Figure 23:
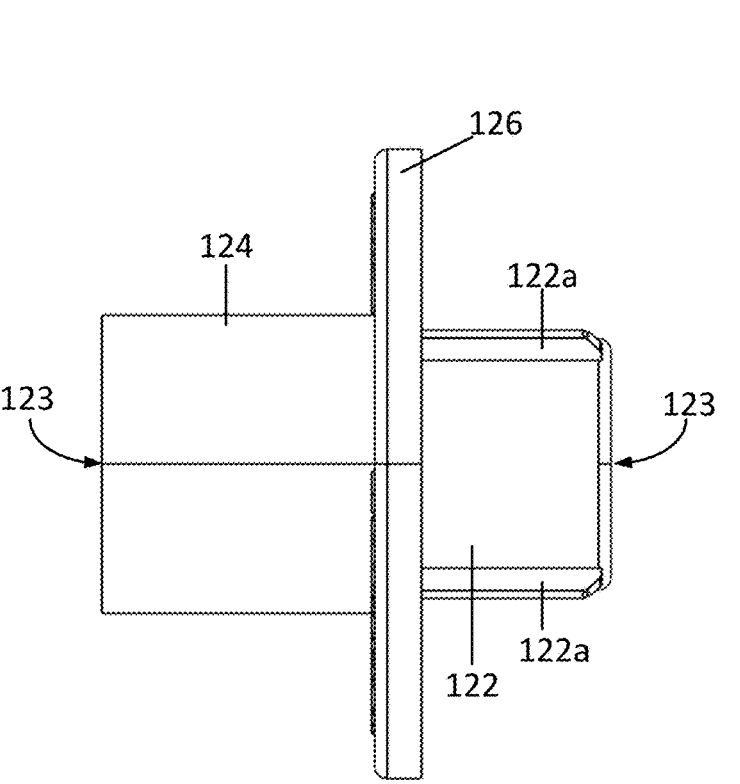
FIG. 23 is a side elevation view of the base member of FIG. 19.

Furthermore, as can be seen from FIGS. 17-18, lower body portion 114 may have a shoulder 117 formed in bore 113. Shoulder 117 may be configured to have spring member 140 (discussed below) situated against it (e.g., directly or indirectly via one or more intervening layers), thereby facilitating retention of spring member 140 within valve 100. To that end, the dimensions and contour(s) of shoulder 117 may be customized, as desired.

Regarding opening(s) 115, the general shape and size thereof may be customized, as desired. In some embodiments, a given opening 115 may be generally circular, elliptical, semi-circular, or semi-elliptical in cross-sectional shape. In some other embodiments, a given opening 115 may be generally polygonal (e.g., triangular, rectangular, square, etc.) in cross-sectional shape. Also, the longitudinal extent (e.g., length) and transverse extent (e.g., width or diameter) of a given opening 115 may be customized, as desired, and may depend, at least in part, on the local material thickness of upper body portion 112 and/or lower body portion 114.

In some embodiments, piercing member 110 may include only a single opening 115, whereas in other embodiments, a plurality of openings 115 (e.g., two, three, four, or more) may be provided. In cases where a plurality of openings 115 is provided, the arrangement/spacing thereof may be customized, as desired. For instance, any two openings 115 may be spaced apart from one another, for example, at an offset of 180°, 150°, 135°, 120°, 90°, 60°, 45°, 30°, or any other desired amount around the periphery of piercing member 110. As can be seen from FIGS. 11-14, in an example embodiment, piercing member 110 may include two similarly configured openings 115 arranged substantially opposite one another (e.g., at an offset of about 180°) about the periphery of piercing member 110 in the region where upper body portion 112 and lower body portion 114 meet.

Piercing member 110 may be constructed, in part or in whole, from any of a wide range of suitable materials, including polymers and composites. For instance, in some cases, piercing member 110 may be formed, at least in part, from polypropylene (PP) or a polypropylene-based material. In some cases, piercing member 110 may be formed, at least in part, from polyethylene (PE) or a polyethylene-based material. In some cases, piercing member 110 may be formed, at least in part, from polyoxymethylene (POM) or a polyoxymethylene-based material. Moreover, piercing member 110 may be of monolithic construction (i.e., single-piece construction) or polylithic construction (i.e., multi-piece construction), as desired. Other suitable constructions for piercing member 110 will depend on a given target application or end-use and will be apparent in light of this disclosure.

FIGS. 19-25 illustrate several views of a base member 120 configured in accordance with an embodiment of the present disclosure. As can be seen, base member 120, sometimes alternatively referred to as a hub, may include a lower body portion 122 and an upper body portion 124. Also, as can be seen, an exterior of base member 120 may include a flange portion 126 extending radially, for example, from the region where lower body portion 122 and upper body portion 124 meet. Furthermore, as can be seen, base member 120 may have formed therein a bore 123 extending along at least a portion of its longitudinal extent (e.g., length) from upper body portion 124 to lower body portion 122.

In general, base member 120 may be configured to be situated adjacent (e.g., in direct or indirect physical contact with or otherwise disposed proximate to) the exterior of a penetrable container 10 with which valve 100 is interfaced. In at least some cases, however, at least a portion of base member 120 (e.g., upper body portion 124) may be configured to be at least partially inserted into penetrable container 10 in a manner providing a liquid-tight seal at the interface thereof. As will be appreciated in light of this disclosure, such liquid-tight sealing may prevent (or otherwise reduce) leakage at the installation site for valve 100. By virtue of the physical presence of flange portion 126 (discussed below), lower body portion 122 may be prevented from being inserted into penetrable container 10. In some cases, flange portion 26 may be made to abut the exterior of penetrable container 10, though such abutting is not required for proper operation of valve 100, as a gap between the exterior of penetrable container 10 and flange portion 126 may be permitted in some instances. Furthermore, bore 123 may define, at least in part, an internal fluid channel or passageway of valve 100 through which liquid may flow (e.g., from upstream piercing member 110) when being dispensed by valve 100 and, to that end, may be configured to be in flow communication with bore 113 (of piercing member 110).

As can be seen from FIGS. 19-25, in some embodiments, upper body portion 124 and/or lower body portion 122 may be of generally tubular shape, at least partially defining a bore 123 of base member 120. In some embodiments, upper body portion 124 and/or lower body portion 122 may be generally annular in cross-sectional shape, having a circular, elliptical, semi-circular, or semi-elliptical geometry. In some other embodiments, upper body portion 124 and/or lower body portion 122 may be generally annular in cross-sectional shape, having a generally polygonal (e.g., triangular, rectangular, square, etc.) geometry.

Also, the longitudinal extent (e.g., length) and transverse extent (e.g., width or diameter) of upper body potion 124 and/or lower body portion 122 may be customized, as desired. In some embodiments, upper body portion 124 may have a length in the range of about 0.25-0.5 in (e.g., about 0.25-0.3 in, about 0.3-0.35 in, about 0.35-0.4 in, about 0.4-0.45 in, about 0.45-0.5 in, or any other sub-range in the range of about 0.25-0.5 in). In some embodiments, upper body portion 124 may have a width or diameter in the range of about 0.25-0.5 in (e.g., about 0.25-0.3in, about 0.3-0.35 in, about 0.35-0.4 in, about 0.4-0.45 in, about 0.45-0.5 in, or any other sub-range in the range of about 0.25-0.5 in). In some embodiments, lower body portion 122 may have a length in the range of about 0.25-1.0 in (e.g., about 0.25-0.5 in, about 0.5-0.75 in, about 0.75-1.0 in, or any other sub-range in the range of about 0.25-1.0 in). In some embodiments, lower body portion 122 may have a width or diameter in the range of about 0.25-0.5 in (e.g., about 0.25-0.3 in, about 0.3-0.35 in, about 0.35-0.4 in, about 0.4-0.45 in, about 0.45-0.5 in, or any other sub-range in the range of about 0.25-0.5 in). In some embodiments, upper body portion 124 and/or lower body portion 122 may have a substantially uniform width or diameter along its entire length. In some other embodiments, upper body portion 124 and/or lower body portion 122 may have a non-uniform (e.g., tapered, flared, ribbed, notched, constricted, bulged, or otherwise varying) width or diameter along all or a portion of its entire length. In some embodiments, upper body portion 124 and lower body portion 122 may be of substantially similar (e.g., the same) shape and/or size, whereas in other embodiments, they may differ from one another in one or more aspects.

Regarding bore 123 of base member 120, the general shape thereof may be customized, as desired. In some embodiments, bore 123 may be generally circular, elliptical, semi-circular, or semi-elliptical in cross-sectional shape. In some other embodiments, bore 123 may be generally polygonal (e.g., triangular, rectangular, square, etc.) in cross-sectional shape.

Also, the longitudinal extent (e.g., length) and transverse extent (e.g., width or diameter) of bore 123 may be customized, as desired. In some embodiments, the segment of bore 123 within upper body portion 124 may have a length in the range of about 0.0625-0.5 in (e.g., about 0.0625-0.1 in, about 0.1-0.25 in, about 0.25-0.5 in, or any other sub-range in the range of about 0.0625-0.5 in). In some embodiments, the segment of bore 123 within upper body portion 124 may have a width or diameter in the range of about 0.25-0.5 in (e.g., about 0.25-0.3 in, about 0.3-0.35 in, about 0.35-0.4 in, about 0.4-0.45 in, about 0.45-0.5 in, or any other sub-range in the range of about 0.25-0.5 in). In some embodiments, the segment of bore 123 within lower body portion 122 may have a width or diameter in the range of 1-5 mm (e.g., 1-2.5 mm, 2.5-3.5 mm, 3.5-5 mm, or any other sub-range in the range of 1-5 mm). In some embodiments, bore 123 may have a substantially uniform width or diameter along its entire length. In some other embodiments, bore 123 may have a non-uniform (e.g., tapered, flared, ribbed, notched, constricted, bulged, or otherwise varying) width or diameter along all or a portion of its entire length. As will be appreciated in light of this disclosure, it generally may be desirable to ensure that bore 123 is sufficiently sized and of appropriate geometry to permit actuator member 130 to move longitudinally and/or laterally therein to a degree sufficient to permit proper sealing/unsealing of the fluid channel of valve 100 and, thus, fluid flow in operation of valve 100. Also, it generally may be desirable to ensure that bore 123 is not so large as to permit lodging of debris therein, as such foreign matter could impede or negate the function of actuator member 130 and, thus, render valve 100 inoperable.

Figure 24:
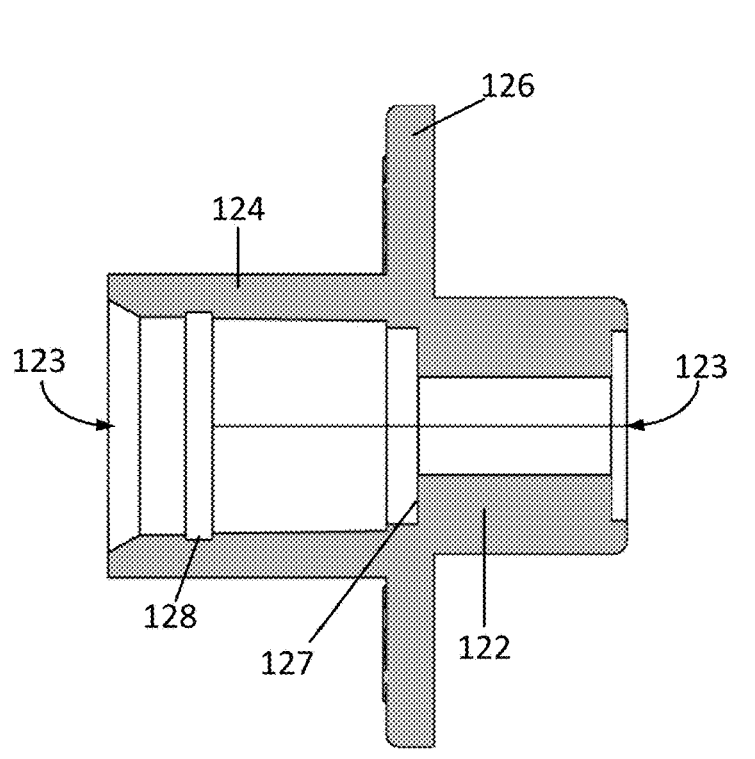
FIG. 24 is a cross-sectional view of the base member of FIG. 19.
Figure 25:
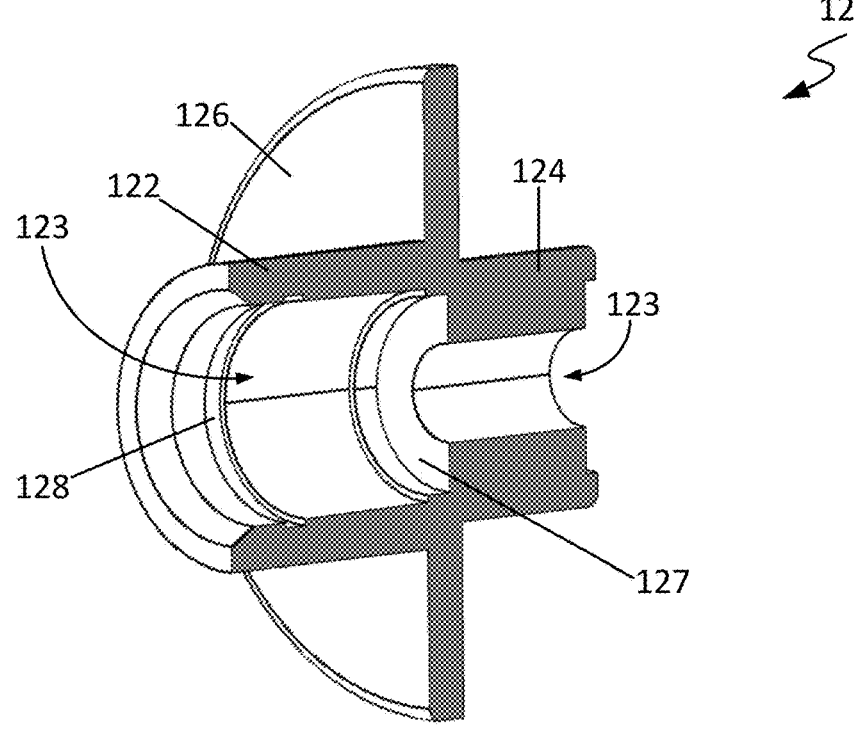
FIG. 25 is an isometric cross-sectional view of the base member of FIG. 19.

Furthermore, as can be seen from FIGS. 24-25, base member 120 may have a shoulder 127 formed in bore 123 in the region where lower body portion 122, upper body portion 124, and flange portion 126 meet. Shoulder 127 may be configured to have sealing member 150 (discussed below) situated against it (e.g., directly or indirectly via one or more intervening layers), thereby facilitating retention of sealing member 150 within valve 100. To that end, the dimensions and contour(s) of shoulder 127 may be customized, as desired.

In accordance with some embodiments, base member 120 optionally may include one or more exterior projections 122a configured to facilitate provision of a secure fit between valve 100 and a given host platform 20 (e.g., a reusable/disposable cage or other enclosure). For instance, projection(s) 122a may be configured to puncture, pierce, cut, or slice through the local material at a given installation site of host platform 20. If host platform 20 includes, for example, a pre-formed perforation, cross-cut, hole, or other localized thinning or weakening of material, projection(s) 122a may facilitate insertion and retention of valve 100 at such installation site. Additionally (or alternatively), if a rubber grommet (or the like) is included at the installation site, projection(s) 122a may be interfaced therewith, providing a reliable friction fit for valve 100 at such installation site.

As can be seen from FIGS. 19-23, in some embodiments, a given projection 122a may be a raised fin or rib extending along all or at least a portion of the longitudinal extent (e.g., length) of lower body portion 122. In some embodiments, a given projection 122a may be continuous in form along its entire length, whereas in other embodiments, a given projection 122a may be segmented or otherwise discontinuous in form along all or a portion of its entire length. In some embodiments, a given projection 122a may extend substantially radially outward from the exterior surface of lower body portion 122. In some instances, a given projection 122a may extend all the way out to the perimetral edge of flange portion 126, whereas in other instances, a given projection 122a may terminate radially inward of that perimetral edge.

In some embodiments, a given projection 122a may terminate in a chamfered, angled, or beveled edge, the profile of which may be customized, as desired. In some cases, the end of a given projection 122a may terminate in a sharp or pointed edge sufficient to effectuate cutting or piercing. In some cases, a given projection 122a may be generally knife-like or razor-like in cutting profile.

Regarding projection(s) 122a, the general shape and size thereof may be customized, as desired. As can be seen from FIGS. 19-23, in some embodiments, a given projection 122a may be generally prismatic in shape, having a generally polygonal (e.g., triangular, rectangular, square, etc.) cross-sectional geometry. In some other embodiments, a given projection 122a may be generally cylindrical in shape, having a generally rounded (e.g., circular, elliptical, semi-circular, semi-elliptical, etc.) cross-sectional geometry. Also, the longitudinal extent (e.g., length), transverse extent (e.g., width or diameter), and radial extent of a given projection 122a may be customized, as desired, and may depend, at least in part, on the dimension(s) of lower body portion 122 and/or flange portion 126 (discussed below).

In some embodiments, base member 120 may include only a single projection 122a, whereas in other embodiments, a plurality of projections 122a (e.g., two, three, four, or more) may be provided. In cases where a plurality of projections 122a is provided, the arrangement/spacing thereof may be customized, as desired. For instance, any two projections 122a may be spaced apart from one another, for example, at an offset of 180°, 150°, 135°, 120°, 90°, 60°, 45°, 30°, or any other desired amount around the periphery of lower body portion 122. As can be seen from FIGS. 19-22, in an example embodiment, base member 120 may include three similarly configured projections 122a arranged substantially radially equidistant from one another (e.g., at an offset of about) 120° about the periphery of lower body portion 122.

Regarding flange portion 126, the general shape and size thereof may be customized, as desired. As can be seen from FIGS. 19-25, in some embodiments, flange portion 126 may be generally disc-like, plate-like, or ring-like, having a generally circular, elliptical, semi-circular, or semi-elliptical geometry. In some other embodiments, flange portion 126 may be generally disc-like, plate-like, or ring-like, having a generally polygonal (e.g., triangular, rectangular, square, etc.) geometry. In some embodiments, flange portion 126 may be of substantially planar form, whereas in other embodiments, flange portion 126 may have one or more regions of non-planarity (e.g., faceted, undulating, textured, or stepped surface contour). Also, the longitudinal extent (e.g., thickness) and transverse extent (e.g., width or diameter) of flange portion 126 may be customized, as desired.

Base member 120 may be constructed, in part or in whole, from any of a wide range of suitable materials. For instance, in some cases, base member 120 may be formed, at least in part, from polypropylene (PP) or a polypropylene-based material. In some cases, base member 120 may be formed, at least in part, from polyethylene (PE) or a polyethylene-based material. In some cases, base member 120 may be formed, at least in part, from polyoxymethylene (POM) or a polyoxymethylene-based material. In some cases, base member 120 may be formed, at least in part, from stainless steel or a stainless steel-based material. Moreover, base member 120 may be of monolithic construction (i.e., single-piece construction) or polylithic construction (i.e., multi-piece construction), as desired. Other suitable constructions for base member 120 will depend on a given target application or end-use and will be apparent in light of this disclosure.

In construction of valve 100, piercing member 110 and base member 120 may be engaged or otherwise interfaced with one another in a temporary or permanent manner, as desired. To that end, lower body portion 114 (of piercing member 110) and upper body portion 124 (of base member 120) may include corresponding engagement features 118, 128. In some embodiments, engagement feature 118 (of piercing member 110) may be a protruding rib, and engagement feature 128 (of base member 120) may be a recessed channel which is to receive and retain that protruding rib, providing for snap-fit engagement therebetween. In other embodiments, piercing member 110 and base member 120 may be configured for threaded or friction-fit engagement with one another. In still other embodiments, piercing member 110 and base member 120 may be configured for mechanical fastener-based engagement or adhesive engagement with one another. Other suitable configurations for assembling members 110, 120 will depend on a given target application or end-use and will be apparent in light of this disclosure.

As noted above, valve 100 also may include an internal assembly of components including an actuator member 130, a spring member 140, and a sealing member 150, which may be configured to work in concert with one another within bores 113, 123 to effectuate sealing/unsealing of the fluid channel in operation of valve 100. Each of these elements is discussed in turn below.

Figure 26:
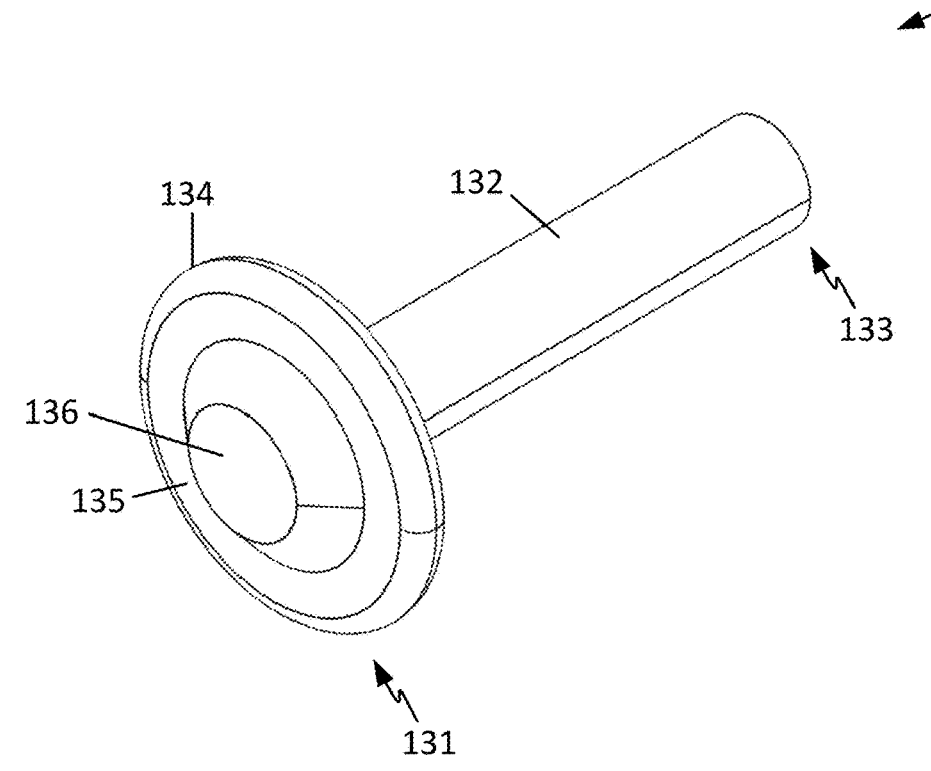
FIG. 26 is an isometric view of an actuator member configured in accordance with an embodiment of the present disclosure.
Figure 27:
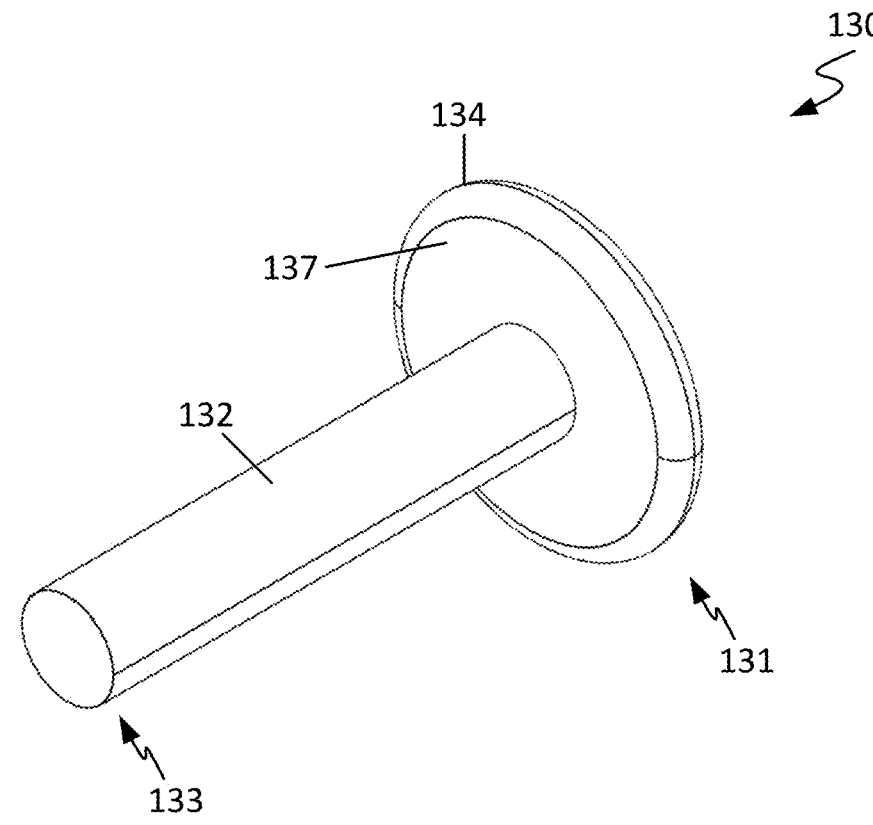
FIG. 27 is another isometric view of the actuator member of FIG. 26.
Figure 28:
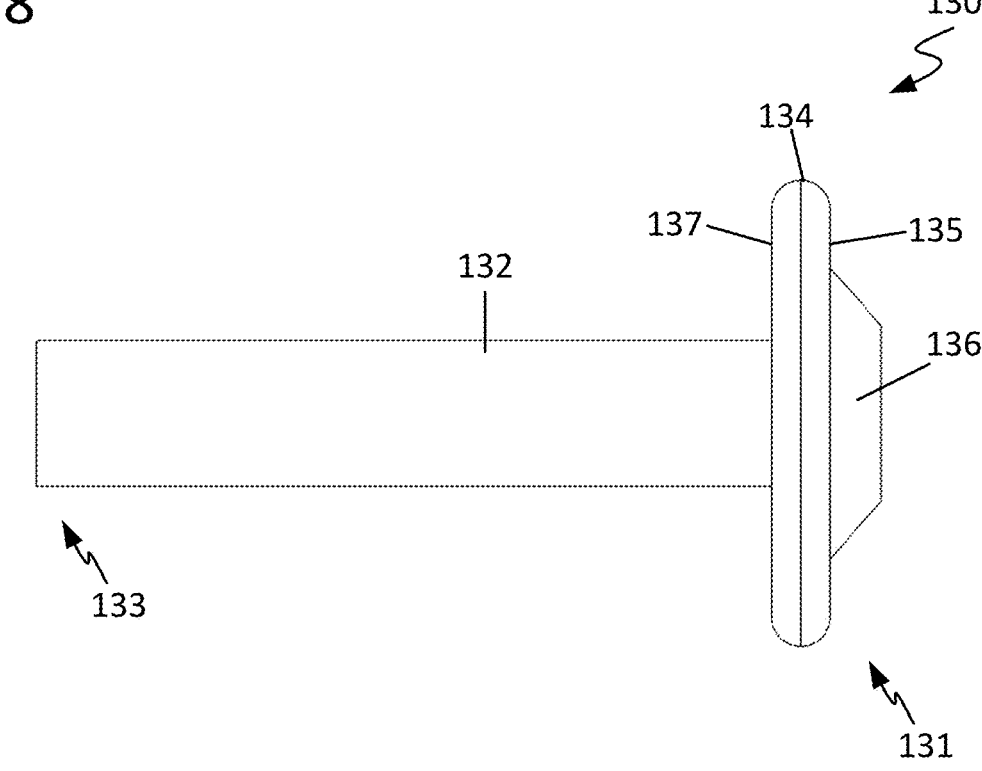
FIG. 28 is a side elevation view of the actuator member of FIG. 26.

FIGS. 26-28 illustrate several views of an actuator member 130 configured in accordance with an embodiment of the present disclosure. As can be seen, actuator member 130, sometimes alternatively referred to as a stem, may include a body portion 132 having a head portion 134 at a first end 131 thereof.

In general, actuator member 130 may be configured to be situated within bore 123 (of base member 120). In such arrangement, head portion 134 may reside within the segment of bore 123 within upper body portion 124, while body portion 132 may reside in part within that same segment and in part within the segment of bore 123 within lower body portion 122. As can be seen further, a second end 133 of body portion 132 may extend beyond the longitudinal extent (e.g., length) of lower body portion 122, thus remaining easily accessible to an animal or other actor intending to operate valve 100.

As can be seen from FIGS. 26-28, in some embodiments, body portion 132 may be generally configured as a rod, shaft, or other rigid or semi-rigid, elongated body. In some embodiments, body portion 132 may be generally cylindrical in shape, having a circular, elliptical, semi-circular, or semi-elliptical cross-sectional geometry. In some other embodiments, body portion 132 may be generally prismatic in shape, having a polygonal (e.g., triangular, rectangular, square, etc.) cross-sectional geometry.

Also, the longitudinal extent (e.g., length) and transverse extent (e.g., width or diameter) of body portion 132 may be customized, as desired. In some embodiments, body portion 132 may have a length in the range of about 0.125-2.0 in (e.g., about 0.125-0.25 in, about 0.25-0.5 in, about 0.5-0.75 in, about 0.75-1.0 in, about 1.0-1.25 in, about 1.25-1.5 in, about 1.5-1.75 in, about 1.75-2.0 in or any other sub-range in the range of about 0.125-2.0 in). In some embodiments, body portion 132 may have a width or diameter in the range of about 0.0625-0.125 in (e.g., about 0.0625-0.08 in, about 0.08-0.1 in, about 0.1-0.125 in, or any other sub-range in the range of about 0.0625-0.125 in). In some embodiments, body portion 132 may have a substantially uniform width or diameter along its entire length. In some other embodiments, body portion 132 may have a non-uniform (e.g., tapered, flared, ribbed, notched, constricted, bulged, or otherwise varying) width or diameter along all or a portion of its entire length. As will be appreciated in light of this disclosure, it generally may be desirable to ensure that body portion 132 is sufficiently sized to permit actuator member 130 to move longitudinally and/or laterally within bore 123 to a degree sufficient to permit fluid flow in operation of valve 100.

As can be seen from FIGS. 26-28, in some embodiments, head portion 134 may be generally configured as a disc, plate, or puck-like body. In some embodiments, head portion 134 may be generally circular, elliptical, semi-circular, or semi-elliptical in shape. In some other embodiments, head portion 134 may be generally polygonal (e.g., triangular, rectangular, square, etc.) in shape. As can be seen further, in some embodiments, head portion 134 may include a raised feature 136 projecting outward from a first side 135 thereof (opposite a second side 137 from which body portion 132 extends). In some such instances, raised feature 136 may include one or more sloped or stepped shoulders, the angle/grade of which may be customized, as desired.

Also, the longitudinal extent (e.g., thickness) and transverse extent (e.g., width or diameter) of head portion 134 may be customized, as desired. In some embodiments, head portion 134 may have a width or diameter commensurate with a width or diameter of upper body portion 124. In some embodiments, head portion 134 may have a substantially uniform thickness. In some other embodiments, head portion 134 may have a non-uniform (e.g., tapered, flared, ribbed, notched, constricted, bulged, or otherwise varying) thickness. As will be appreciated in light of this disclosure, it generally may be desirable to ensure that head portion 134 is sufficiently sized to permit actuator member 130 to move longitudinally and/or laterally within bore 123 to a degree sufficient to permit fluid flow in operation of valve 100.

Actuator member 130 may be constructed, in part or in whole, from any of a wide range of suitable materials, including metals or alloys. For instance, in some cases, actuator member 130 may be formed, at least in part, from a stainless steel or a stainless steel-based material, such as 302 stainless steel or 304 stainless steel, among other suitable types. In some cases, actuator member 130 may be formed, at least in part, from copper (Cu) or a copper-based material, such as brass. Moreover, actuator member 130 may be of monolithic construction (i.e., single-piece construction) or polylithic construction (i.e., multi-piece construction), as desired. Other suitable constructions for actuator member 130 will depend on a given target application or end-use and will be apparent in light of this disclosure.

As previously noted, the internal assembly of valve 100 also may include a spring member 140. As can be seen from FIGS. 3-4 and 9-10, in some embodiments, spring member 140 may be, for example, a compression coil spring. It should be noted, however, that the present disclosure is not intended to be limited only to a coil spring, as in a more general sense, and in accordance with some other embodiments, any suitable spring or other member with sufficient resilience may be utilized, as will be apparent in light of this disclosure.

In general, spring member 140 may be configured to be situated in part within bore 113 (of piercing member 110) and in part within the segment of bore 123 within upper body portion 124 (of base member 120). In such arrangement, a first end of spring member 140 may be made to abut (e.g., directly or indirectly via one or more intervening layers) shoulder 117 of piercing member 110, while a second end of spring member 140 may be made to abut (e.g., directly or indirectly via one or more intervening layers) head portion 134 of actuator member 130, for example, at raised feature 136 thereof. In this manner, raised feature 136 may serve, at least in part, to seat spring member 140 on head portion 134. Furthermore, in such arrangement, spring member 140 may be compressed against shoulder 117 when sufficient force is applied to actuator member 130 to cause deflection thereof and allowed to decompress (or remain uncompressed) when insufficient force (e.g., no force) is applied. In this manner, spring member 140 may be configured to bias actuator member 130 into liquid-tight sealing contact (e.g., directly or indirectly via one or more intervening layers) with sealing member 150.

Also, the dimensions (e.g., wire diameter, coil diameter, and overall length) and stiffness of spring member 140 may be customized, as desired. In some embodiments, spring member 140 may have a coil diameter in the range of about 0.25-0.75 mm (e.g., about 0.25-0.5 mm, about 0.5-0.75 mm, or any other sub-range in the range of about 0.25-0.75 mm). In a specific example case, spring member 140 may have a wire diameter of 0.3 mm, a coil diameter of 0.5 mm, and an overall length of 12 mm. In a specific example case, spring member 140 may be a 2-gram spring. As will be appreciated in light of this disclosure, it generally may be desirable to ensure that spring member 140 is sufficiently constructed and arranged to permit actuator member 130 to move longitudinally and/or laterally within bore 123 to a degree sufficient to permit fluid flow in operation of valve 100.

Spring member 140 may be constructed, in part or in whole, from any of a wide range of suitable materials. For instance, in some cases, spring member 140 may be formed, at least in part, from stainless steel or a stainless steel-based material, such as 302 stainless steel or 304 stainless steel, among other suitable types. Moreover, spring member 140 may be of monolithic construction (i.e., single-piece construction) or polylithic construction (i.e., multi-piece construction), as desired. Other suitable constructions for spring member 140 will depend on a given target application or end-use and will be apparent in light of this disclosure.

As previously noted, the internal assembly of valve 100 also may include a sealing member 150. As can be seen from FIGS. 3-4 and 9-10, in some embodiments, sealing member 150 may be, for example, an O-ring or other suitable gasket. As can be seen further, sealing member 150 may have an opening (e.g., a central aperture or hole) through which body portion 132 of actuator member 130 may be passed.

In general, sealing member 150 may be configured to be situated within the segment of bore 123 within upper body portion 124 (of base member 120). In such arrangement, a first side of sealing member 150 may be made to abut (e.g., directly or indirectly via one or more intervening layers) shoulder 127 of base member 120, while a second side of sealing member 150 may be made to abut (e.g., directly or indirectly via one or more intervening layers) head portion 134 of actuator member 130, for example, at a second side 137 thereof. In this manner, sealing member 150 may be compressed against shoulder 127 when insufficient force (e.g., no force) is applied to actuator member 130 to cause deflection thereof and allowed to decompress (or remain uncompressed) when sufficient force is applied. Consequently, sealing member 150 may be biased into contact with base member 120 (via spring member 140 through intervening actuator member 130) within bore 123 thereof, thereby effectuating a liquid-tight sealing of the fluid channel of valve 100.

Also, the shape and hardness rating of sealing member 150 may be customized, as desired. In some embodiments, sealing member 150 may be of generally toroidal or donut shape (e.g., an O-ring shape), having body portion 132 of actuator member 130 inserted therethrough. In a specific example case, sealing member 150 may be of a 55A hardness rating, though other suitable hardness ratings will be apparent in light of this disclosure and will depend upon a given target application or end-use.

Sealing member 150 may be constructed, in part or in whole, from any of a wide range of suitable materials. For instance, sealing member 150 may be formed, at least in part, from an elastomeric material, such as a rubber (e.g., natural or synthetic) or a thermoplastic, among others. Moreover, sealing member 150 may be of monolithic construction (i.e., single-piece construction) or polylithic construction (i.e., multi-piece construction), as desired. Other suitable constructions for sealing member 150 will depend on a given target application or end-use and will be apparent in light of this disclosure.

FIGS. 29A-29D illustrate several views of an installed valve 100 being operatively interfaced with a penetrable container 10 in the context of an example host platform 20 in accordance with an embodiment of the present disclosure. As can be seen from FIG. 29A, for example, valve 100 first may be installed at an installation site of host platform 20. To such ends, valve 100 may be interfaced with host platform 20, such as by pressing lower body portion 122 (optionally with one or more exterior projections 122*a*) into the installation site. In so doing, flange portion 126 may come to rest on (or near) the host wall or other surface of host platform 20. As previously noted, host platform 20 may be, for example, a reusable/disposable cage or other enclosure, among other options.

Figure 29A:
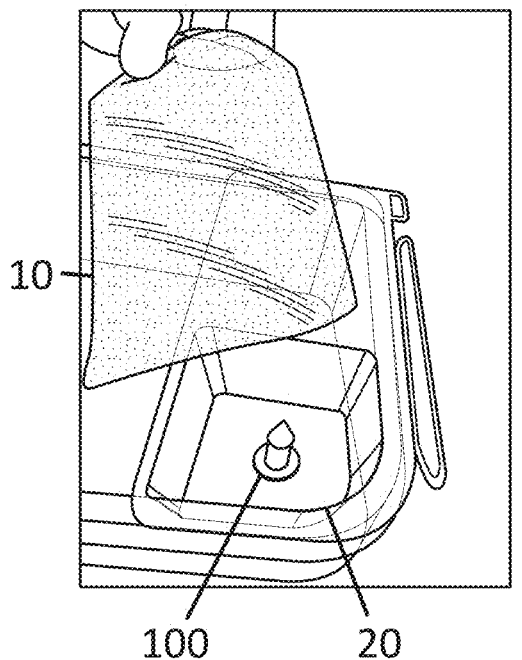
FIGS. 29A-29D are views of an installed valve being operatively interfaced with a penetrable container in the context of an example host platform in accordance with an embodiment of the present disclosure.
Figure 29B:
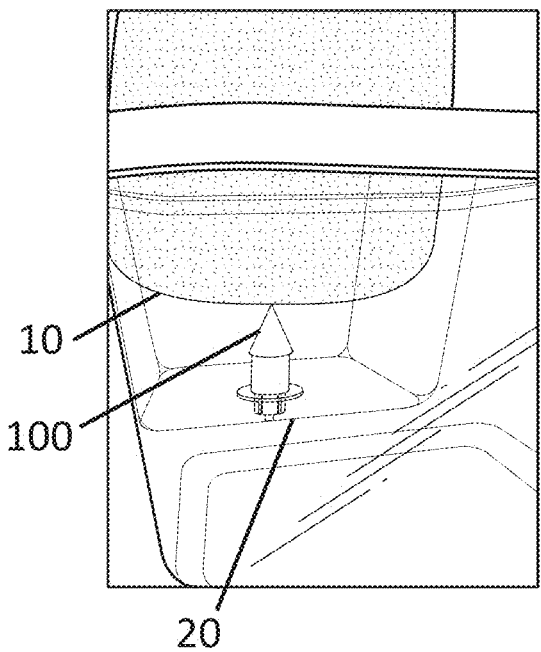
Figure 29C:
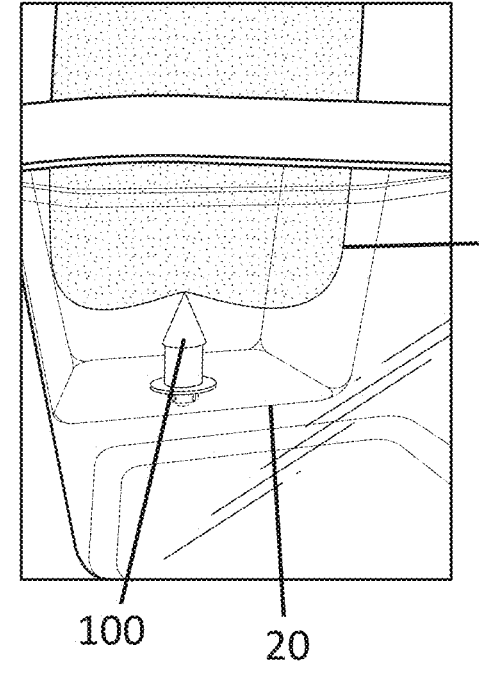
Figure 29D:
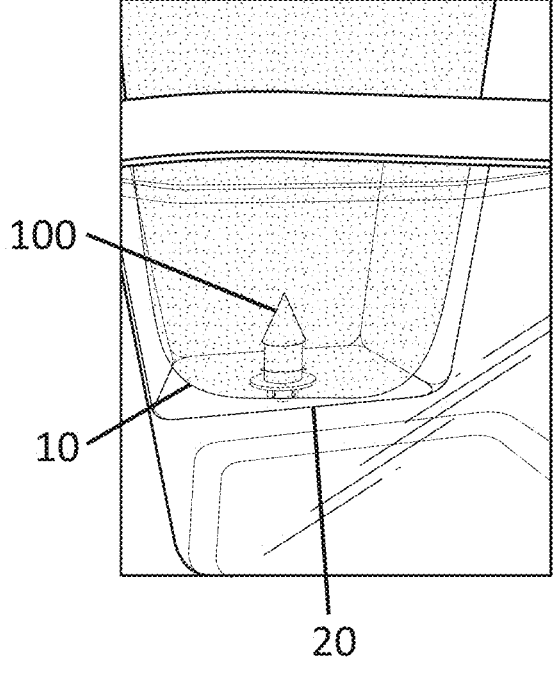

As can be seen from FIGS. 29B-29C, for example, penetrable container 10 then may be placed into contact with valve 100, which in turn may be forced or otherwise permitted to penetrate penetrable container 20 to access a liquid contained therein. As can be seen from FIG. 29D, for example, valve 100 may be at least partially inserted into penetrable container 10 (e.g., up to flange portion 126). In this position, lower body portion 122 of base member 120 may remain accessible outside of penetrable container 10, and, thus, actuator member 130 may remain accessible for actuation by an animal or other actor in normal operation of valve 100.

Figure 30A:
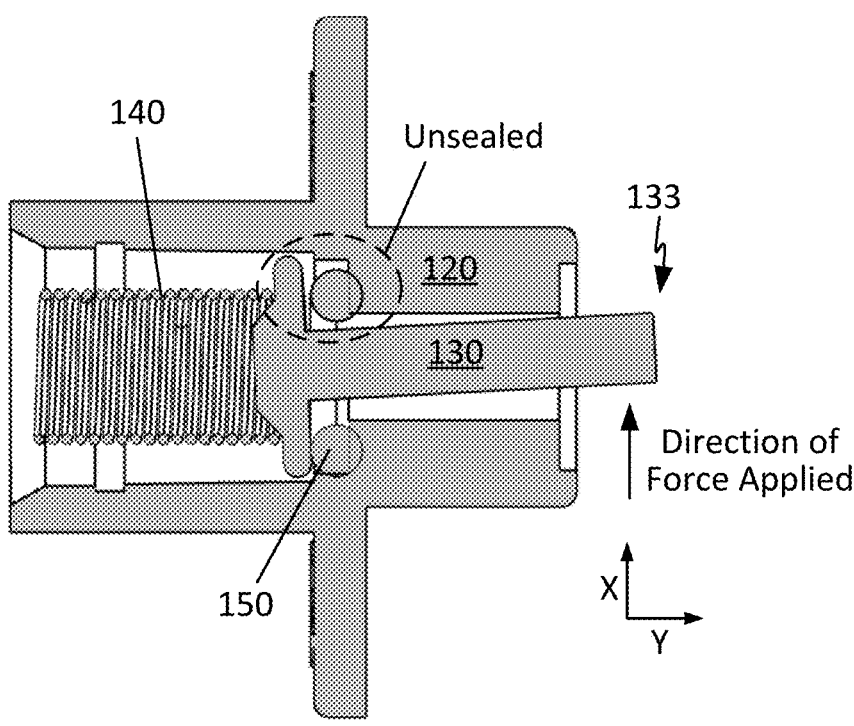
FIGS. 30A-30B are views of an actuated (e.g., opened) valve in accordance with an embodiment of the present disclosure.
Figure 30B:
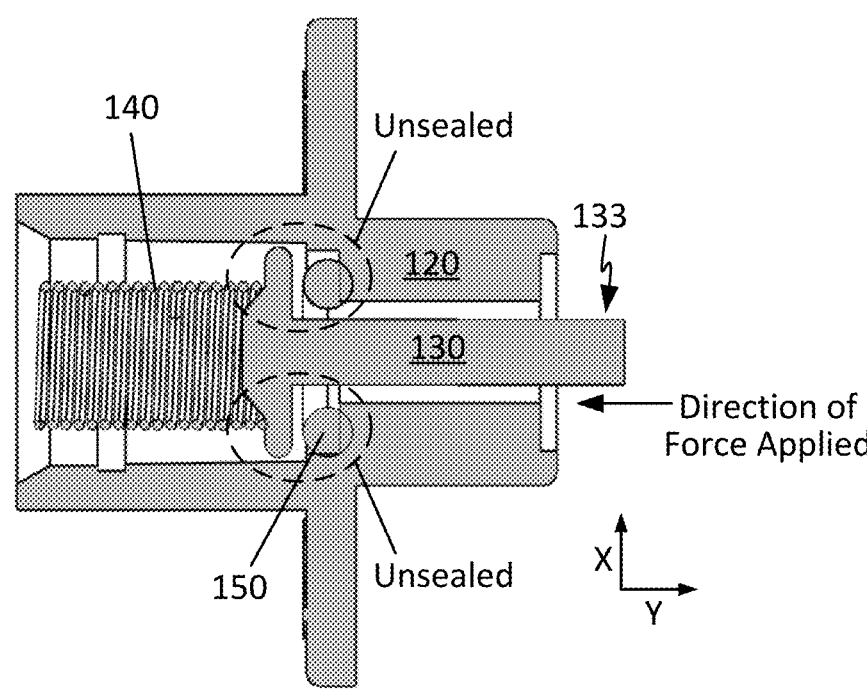

Regarding operation of valve 100 to effectuate a liquid flow therethrough, consider FIGS. 30A-30B, which illustrate several views of an actuated (e.g., opened) valve in accordance with an embodiment of the present disclosure. As can be seen from FIG. 30A, for example, a force may be applied to a second end 133 of actuator member 130 to cause deflection thereof (from its normal resting position against the restorative force of spring member 140) in a direction aligned, to a given degree, with a transverse extent (e.g., width or diameter) of base member 120 (or the overall body member of valve 100 more generally). That is, application of a sufficient force in the X-direction seen in FIG. 30A may cause actuator member 130 to at least partially separate from sealing member 150, thereby opening valve 100 and allowing a liquid to flow therethrough. As can be seen from FIG. 30B, for example, a force alternatively (or additionally) may be applied to a second end 133 of actuator member 130 to cause deflection thereof (from its normal resting position against the restorative force of spring member 140) in a direction aligned, to a given degree, with a longitudinal extent (e.g., length) of base member 120 (or the overall body member of valve 100 more generally). That is, application of a sufficient force in the Y-direction seen in FIG. 30B may cause actuator member 130 to at least partially separate from sealing member 150, thereby opening valve 100 and allowing a liquid to flow therethrough. In this manner, and in accordance with some embodiments, valve 100 may be configured for two-way actuation: side-to-side movement of actuator member 130 and up-and-down movement of actuator member 130. Otherwise stated, actuator member 130 may be deflected horizontally and/or vertically in relation to its typical resting position within bore 123 to adjust the sealing state of valve 100. Moreover, in accordance with some embodiments, actuation also may occur in instances when a force having components in both the X-direction and Y-direction (as seen in FIGS. 30A-30B) is applied to actuator member 130.

Base Member with Sealing Feature(s)

FIGS. 31-35 illustrate several views of a base member 120' configured in accordance with another embodiment of the present disclosure. As can be seen, base member 120' may include a lower body portion 122, an upper body portion 124 (e.g., optionally threaded), and a flange portion 126 configured as variously described herein in relation to base member 120. Moreover, as will be appreciated in light this disclosure, the description provided above with respect to any of the material composition, physical construction, dimensions, geometry, etc., of base member 120 may apply equally here with respect to base member 120', at least in some embodiments.

As can be seen further from FIGS. 31-35, lower body portion 122 of base member 120' may have formed therein at least one exterior channel feature 160, and at least one sealing member 162 may be at least partially disposed therein. Each of these elements is discussed in turn below. Generally, base member 120' may be configured, in accordance with some embodiments, to be at least partially inserted into a given installation site (e.g., an opening, aperture, pre-formed perforation, cross-cut, hole, tube, spacer, grommet, etc.) of a host platform 20.

As noted above, lower body portion 122 of base member 120' may include one or more exterior channel features 160.

A given exterior channel feature 160 may be formed, for example, as a channel, groove, recess, indentation, or other concavity that extends at least partway into the sidewall(s) of lower body portion 122.

The dimensions (e.g., length, width, and/or depth) and geometry of a given exterior channel feature 160 may be customized, as desired for a given target application or end-use. For instance, in some cases, a given exterior channel feature 160 may be generally curved in cross-sectional shape (e.g., open semi-circle, open semi-ellipse, parabolic, arcuate, etc.). In some cases, a given exterior channel feature 160 may be generally linear in cross-sectional shape (e.g., a polygonal chain resembling an open triangle, open rectangle, open square, or other open polygon). In some cases, a given exterior channel feature 160 may be generally U-shaped, V-shaped, or C-shaped in cross-sectional shape. The wall(s) of a given exterior channel feature 160 may be smooth, textured, roughened, curved, planar, or faceted, as desired. If a plurality of exterior channel features 160 is provided, in some such cases, all constituent exterior channel features 160 may be of the same configuration (e.g., thus providing base member 120' with a homogeneous plurality of exterior channel features 160). In other such cases, however, at least one constituent exterior channel feature 160 may differ in configuration from at least one other constituent exterior channel feature 160 (e.g., thus providing base member 120' with a heterogeneous plurality of exterior channel features 160).

A given exterior channel feature 160 may be provided anywhere desired along the longitudinal length of lower body portion 122 of base member 120'. For instance, in some cases, an exterior channel feature 160 may be situated proximal to (e.g., immediately adjacent or otherwise substantially nearby) flange portion 126. In some cases, an exterior channel feature 160 may be situated at or near an end 164 of lower body portion 122 which is distal to flange portion 126. In some cases, an exterior channel feature 160 may be situated substantially at or near a midpoint between flange portion 126 and end 164. Moreover, in cases in which a plurality of exterior channel features 160 is provided, the pitch (e.g., spacing) between any two neighboring exterior channel features 160 may be customized, as desired for a given target application or end-use.

As noted above, a given exterior channel feature 160 may be configured to accommodate one or more sealing members 162 at least partially disposed therein. A given sealing member 162 may be, for example, an O-ring (e.g., a packing or toric joint), gasket, or any other sealing member suitable for providing liquid-tight interfacing, as will be apparent in light of this disclosure. In assembly of base member 120', a given sealing member 162 may be at least partially disposed (e.g., seated or inserted) within a given exterior channel feature 120 such that (1) the body of such sealing member 162 extends only a slight distance (d1) beyond the dimensional extent (e.g., depth) of such exterior channel feature 160 and (2) a small gap or clearance (d2) is provided between the body of such sealing member 162 and sidewall(s) of such exterior channel feature 160, as generally shown in FIG. 34.

The dimensions (e.g., length, width, and/or thickness) and geometry of a given sealing member 162 may be customized, as desired for a given target application or end-use. For instance, in some cases, a given sealing member 162 may be of generally closed-curve cross-sectional shape (e.g., circular, elliptical, oval, etc.). In some cases, a given sealing member 162 may be of generally polygonal cross-sectional shape (e.g., triangular, square, rectangular, etc.). In some cases, a given sealing member 162 may be of generally cruciform cross-sectional shape (e.g., X-shaped or plus-shaped). In some cases, a given sealing member 162 may be T-shaped or I-shaped in cross-sectional form. If a plurality of sealing members 162 is provided, in some such cases, all constituent sealing members 162 may have the same configuration (e.g., thus providing base member 120' with a homogeneous plurality of sealing members 162). In other such cases, however, at least one constituent sealing member 162 may differ in configuration from at least one other constituent sealing member 162 (e.g., thus providing base member 120' with a heterogeneous plurality of sealing members 162).

Furthermore, the material composition and physical construction of a given sealing member 162 may be customized, as desired for a given target application or end-use. For instance, a given exterior sealing member 162 may be formed, in part or in whole, from an elastomeric material, such as a rubber (e.g., natural or synthetic) or a thermoplastic, among others. Moreover, a given exterior sealing member 162 may be of monolithic construction (i.e., single-piece construction) or polylithic construction (i.e., multi-piece construction), as desired.

Generally, a base member 120' provided as variously described herein may be configured for operative interfacing with a given installation site such that lower body portion 122 thereof becomes at least partially inserted into such installation site while one or more attendant sealing members 162 come into physical contact with interior surface(s) of such installation site, forming a liquid-tight seal thereat.

In accordance with some embodiments, base member 120' may be utilized as an alternative to a base member 120 in providing a valve 100 as variously described herein. In accordance with some other embodiments, however, base member 120', as an individual component, may be assembled with one or more other components to provide a valve which differs from valve 100.

In the case of a valve 100 including both a piercing member 110 and a base member 120' being installed at a given installation site of a host platform 20, a penetrable container 10 may come to reside proximate (e.g., on or adjacent) a first side 126a (e.g., an upper or top side) of flange portion 126, with piercing member 110 penetrating said penetrable container 10, while portion(s) of the installation site (e.g., a wall, floor, lid, ramp, basin, rim, etc.) may come to reside proximate (e.g., on or adjacent) an opposing second side 126b (e.g., a lower or bottom side) of flange portion 126. In this manner, liquid may flow from penetrable container 10 through valve 100 (e.g., through bore 113 of piercing member 110 and bore 123 of base member 120') and, thus, through the installation site. The liquid-tight sealing afforded by base member 120' may prevent liquid from otherwise flowing through the installation site in bypass of valve 100.

In accordance with some embodiments, an end 164 of lower body portion 122 of base member 120' optionally may include a tapered portion 166. Tapered portion 166 may be configured, for example, to facilitate fitting of lower body portion 122 into a given installation site, improving tolerance to initial misalignment when being installed (e.g., inserted) by a user. To that end, the angle of tapering, sloping, or shouldering of tapered portion 166 may be customized, as desired for a given target application or end-use.

Additionally, it should be noted that base member 120', inclusive of exterior channel feature(s) 160 and sealing member(s) 162, also optionally may include one or more exterior projections 122*a*, as variously described herein. In some such cases, the structure or contour of a given exterior projection 122*a* may be interrupted, at one or more locations, by the physical presence of a given exterior channel feature 160 and/or sealing member 162 passing therethrough. Interruption(s) of this nature may be provided anywhere desired along the longitudinal length of lower body portion 122 of base member 120'.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. An animal drinking valve configured to penetrate a penetrable container to allow a liquid to flow from the penetrable container through the valve, the valve comprising:

a piercing member configured to facilitate penetration of the penetrable container by the valve; and a base member operatively coupled with the piercing member, the base member comprising:

a flange portion;

at least one exterior channel feature; and at least one sealing member at least partially disposed within the at least one exterior channel feature;

wherein in operative interfacing of the valve with an installation site through which the liquid is to flow:

the penetrable container resides proximate a first side of the flange portion;

an opening formed in the installation site resides proximate a second side of the flange portion, said second side opposing said first side; and the at least one sealing member provides a liquid-tight seal at the installation site such that the liquid does not otherwise flow through the installation site in bypass of the valve.

2. The valve of claim 1, wherein the base member has defined therein:

a first portion of a bore of the valve; and at least one opening configured to be in flow communication with the bore of the valve to allow liquid to flow out from the bore of the valve.

3. The valve of claim 2, wherein the piercing member has defined therein:

a second portion of the bore of the valve; and at least one opening configured to be in flow communication with the bore of the valve to allow liquid to flow into the bore of the valve from the penetrable container.

4. The valve of claim 1, wherein in operative interfacing of the valve with the installation site, the flange portion abuts the opening.

5. The valve of claim 1, wherein in operative interfacing of the valve with the installation site, the at least one sealing member at least partially resides within the opening.

6. The valve of claim 5, wherein the at least one sealing member physically contacts at least one sidewall within the opening, providing the liquid-tight seal thereat.

7. The valve of claim 1, wherein the at least one sealing member comprises an O-ring.

8. The valve of claim 1, wherein the piercing member has defined therein:

a portion of a bore of the valve; and at least one opening configured to be in flow communication with the bore of the valve to allow liquid to flow from the penetrable container into the bore of the valve.

9. The valve of claim 1, wherein the piercing member is of conical configuration, terminating in a sharp tip.

10. A system comprising:

the valve of claim 1; and a cage or enclosure comprising the installation site.

11. The valve of claim 1, wherein the base member further comprises a body portion, wherein the body portion includes the at least one exterior channel feature.

12. The valve of claim 11, wherein:

the at least one exterior channel feature comprises a plurality of exterior channel features disposed along a longitudinal length of the body portion of the base member; and the at least one sealing member comprises a corresponding plurality of sealing members, each such sealing member at least partially disposed within an associated exterior channel feature.

13. The valve of claim 12, wherein at least one of the plurality of exterior channel features and the plurality of sealing members is a homogeneous plurality.

14. The valve of claim 12, wherein at least one of the plurality of exterior channel features and the plurality of sealing members is a heterogeneous plurality.

15. The valve of claim 11, wherein the body portion of the base member comprises a polymer.

16. The valve of claim 15, wherein the polymer is selected from a group consisting of:

polypropylene or a polypropylene-based material;

polyethylene or a polyethylene-based material; and polyoxymethylene or a polyoxymethylene-based material.

17. The valve of claim 11, wherein the base member further comprises at least one external projection extending radially outward from the body portion.

18. The valve of claim 17, wherein the at least one external projection is configured as a raised rib extending along at least a portion of a longitudinal length of the body portion of the base member.

19. The valve of claim 17, wherein the at least one external projection terminates in a sharp end.

20. The valve of claim 17, wherein the at least one external projection has a sharp edge.

\* \* \* \* \*